( 12 ) United States Patent
Riis et al.

(10) Patent No.: US 9,468,584 B2
(45) Date of Patent: Oct. 18, 2016

(54) CHILD-RESISTANT PACKAGING

(71) Applicants: Jennifer L. Riis, Neenah, WI (US);
Christopher R. Jansen, Kaukauna, WI (US)

(72) Inventors: Jennifer L. Riis, Neenah, WI (US);
Christopher R. Jansen, Kaukauna, WI (US)

(73) Assignee: Bemis Company, Inc., Neenah, WI (US)

( * ) Notice: Subject to any disclaimer, the term of this patent is extended or adjusted under 35 U.S.C. 154(b) by 97 days.

(21) Appl. No.: 14/243,408

(22) Filed: Apr. 2, 2014

(65) Prior Publication Data

US 2015/0283029 A1    Oct. 8, 2015

(51) Int. Cl.
*B65D 83/04*        (2006.01)
*B65D 85/42*        (2006.01)
(Continued)

(52) U.S. Cl.
CPC .................. *A61J 1/035* (2013.01); *B32B 3/04* (2013.01); *B32B 7/06* (2013.01); *B32B 7/12* (2013.01); *B32B 15/08* (2013.01); *B32B 15/20* (2013.01); *B32B 27/34* (2013.01); *B32B 27/36* (2013.01); *B65D 65/14* (2013.01); *B65D 65/40* (2013.01); *B65D 65/42* (2013.01); *B65D 75/367* (2013.01); *B65D 75/585* (2013.01); *B65D 75/5855* (2013.01); *B32B 2250/04* (2013.01); *B32B 2307/31* (2013.01); *B32B 2307/514* (2013.01); *B32B 2307/7242* (2013.01); *B32B 2307/7265* (2013.01); *B32B 2307/75* (2013.01);
(Continued)

(58) Field of Classification Search
CPC  B65D 83/04; B65D 83/0409; B65D 75/325; B65D 75/326; B65D 75/36; B65D 65/40; B65D 65/14; B65D 65/42; B65D 75/367; B65D 75/585; B65D 75/5855; A61J 1/035; B32B 7/06; B32B 7/12; B32B 15/08; B32B 15/20; B32B 27/34; B32B 24/36; B32B 3/04

USPC .......................................... 206/528–532, 539
See application file for complete search history.

(56) References Cited

U.S. PATENT DOCUMENTS 3,635,376 A    1/1972    Hellstrom
3,809,221 A    5/1974    Compere
(Continued)

FOREIGN PATENT DOCUMENTS

EP    0481471 A1    4/1992
EP    1283224 A1    2/2003
(Continued)

OTHER PUBLICATIONS

Drug Information Online, retrieved Apr. 8, 2013 at http://www.drugs.com/pro/nicotine-patch.html.
Jester, Randy, Conference Paper, "TOPAS® Cyclic Olefin Copolymers in Food Packaging—High Aroma Barrier combined with Low Extractables", 2005 Place Conference.
Jester, Randy, "Add a Layaer of COC to Boost Polyolefin Film Properties", Plastics Technology, retrieved online Jan. 27, 2014 at www.ptonline.com/articles/add-a-layer-of-COC-to-boost-polyolefin-film-properties.
(Continued)

*Primary Examiner* — Jacob K Ackun
*Assistant Examiner* — Rafael Ortiz
(74) *Attorney, Agent, or Firm* — Sheena E. Conners

(57) ABSTRACT

A child-resistant blister package that is also easily opened by adults. The package includes a formed blister film and a lidstock having at least four layers: i) an inner thermoplastic heat sealable layer; ii) a first intermediate aluminum foil layer; iii) a second intermediate adhesive layer; and iv) an outer layer having a loop shaped score line therethrough. The formed blister film has at least two compartments: (i) a first blister compartment adapted for receiving a product (a); and (ii) a second blister compartment adapted for manual inward deformation activation of separation of the lidstock from itself along a score line tab area portion.

17 Claims, 6 Drawing Sheets

(51) Int. Cl.
*A61J 1/03* (2006.01)
*B65D 65/14* (2006.01)
*B65D 65/42* (2006.01)
*B65D 75/36* (2006.01)
*B65D 75/58* (2006.01)
*B65D 65/40* (2006.01)
*B32B 7/06* (2006.01)
*B32B 7/12* (2006.01)
*B32B 15/08* (2006.01)
*B32B 15/20* (2006.01)
*B32B 27/34* (2006.01)
*B32B 27/36* (2006.01)
*B32B 3/04* (2006.01)

(52) U.S. Cl.
CPC ........ *B32B2439/00* (2013.01); *B65D 2215/00* (2013.01); *B65D 2565/382* (2013.01); *B65D 2575/365* (2013.01)

(56) References Cited

U.S. PATENT DOCUMENTS

| | | | |
|---|---|---|---|
| 3,912,081 A * | 10/1975 | Haines | B65D 75/327 206/459.5 |
| 4,211,326 A | 7/1980 | Hein et al. | |
| 4,294,361 A | 10/1981 | Margulies et al. | |
| 5,203,470 A | 4/1993 | Brown | |
| 5,469,968 A | 11/1995 | Matthews et al. | |
| 5,532,030 A | 7/1996 | Hirose et al. | |
| 5,712,031 A | 1/1998 | Kelch et al. | |
| 5,758,774 A | 6/1998 | Leblong | |
| 5,783,273 A | 7/1998 | Yamamoto et al. | |
| 5,862,915 A | 1/1999 | Plezia et al. | |
| 5,894,930 A | 4/1999 | Faughey et al. | |
| 5,897,941 A | 4/1999 | Shah | |
| 6,006,913 A | 12/1999 | Ludemann et al. | |
| 6,041,929 A | 3/2000 | Brunner et al. | |
| 6,383,592 B1 * | 5/2002 | Lowry | B65D 31/02 206/459.5 |
| 6,705,467 B1 | 3/2004 | Kancsar et al. | |
| 6,746,743 B2 | 6/2004 | Knoerzer et al. | |
| 6,969,740 B2 | 11/2005 | Klosiewicz | |
| 7,063,211 B2 | 6/2006 | Williams-Hartman | |
| 7,189,300 B2 | 3/2007 | Knoerzer et al. | |
| 7,243,798 B2 | 7/2007 | Buss | |
| 7,288,316 B2 | 10/2007 | Jester | |
| 7,365,130 B2 | 4/2008 | Rivett et al. | |
| 7,416,768 B2 | 8/2008 | Knoerzer et al. | |
| 7,497,623 B2 | 3/2009 | Thomas et al. | |
| 7,608,317 B2 | 10/2009 | Keckeisen et al. | |
| 7,686,513 B2 | 3/2010 | Knoerzer et al. | |
| 7,829,633 B2 | 11/2010 | Heukelbach et al. | |
| 7,854,225 B2 | 12/2010 | Pasbrig et al. | |
| 7,919,171 B2 | 4/2011 | Young | |
| 8,056,716 B2 | 11/2011 | Fonteyne et al. | |
| 8,206,796 B2 | 6/2012 | Opusko et al. | |
| 8,574,694 B2 | 11/2013 | Neill et al. | |
| 8,863,967 B2 | 10/2014 | Suzuki et al. | |
| 2002/0012781 A1 | 1/2002 | Beer et al. | |
| 2002/0061982 A1 | 5/2002 | Donald et al. | |
| 2005/0186373 A1 | 8/2005 | Rhee et al. | |
| 2005/0260366 A1 | 11/2005 | Magnusson | |
| 2006/0027480 A1 * | 2/2006 | Buss | B65D 75/327 206/532 |
| 2006/0046006 A1 | 3/2006 | Bastion | |
| 2006/0062946 A1 | 3/2006 | Beer et al. | |
| 2006/0198973 A1 | 9/2006 | Jester | |
| 2006/0249422 A1 | 11/2006 | Bates, Jr. | |
| 2006/0283758 A1 | 12/2006 | Pasbrig | |
| 2007/0202337 A1 | 8/2007 | Lischefski et al. | |
| 2007/0212539 A1 | 9/2007 | Yamada et al. | |
| 2007/0221534 A1 | 9/2007 | Intini | |
| 2007/0224379 A1 | 9/2007 | Stevenson | |
| 2008/0067099 A1 | 3/2008 | Young | |
| 2008/0075901 A1 | 3/2008 | Lee et al. | |
| 2008/0227900 A1 | 9/2008 | Borke et al. | |
| 2008/0251411 A1 | 10/2008 | Walker et al. | |
| 2008/0280117 A1 | 11/2008 | Knoll et al. | |
| 2008/0286547 A1 | 11/2008 | Hubbard et al. | |
| 2009/0081439 A1 | 3/2009 | Lischefski et al. | |
| 2009/0110888 A1 | 4/2009 | Wuest et al. | |
| 2009/0123611 A1 | 5/2009 | Bekele | |
| 2009/0208685 A1 | 8/2009 | Rivers et al. | |
| 2009/0285511 A1 | 11/2009 | Aithani | |
| 2009/0310890 A1 | 12/2009 | Suzuki et al. | |
| 2009/0324911 A1 | 12/2009 | Li et al. | |
| 2010/0009208 A1 | 1/2010 | Lee | |
| 2010/0127073 A1 | 5/2010 | Van Esch | |
| 2010/0163446 A1 | 7/2010 | Suzuki et al. | |
| 2011/0005961 A1 | 1/2011 | Leplatois et al. | |
| 2011/0049003 A1 | 3/2011 | Bellamah et al. | |
| 2011/0101342 A1 | 5/2011 | Kim et al. | |
| 2011/0104342 A1 | 5/2011 | Glaser et al. | |
| 2011/0174651 A1 | 7/2011 | Kimball | |
| 2011/0198261 A1 | 8/2011 | Kurtze et al. | |
| 2011/0262589 A1 | 10/2011 | Safarik | |
| 2012/0107542 A1 | 5/2012 | Nelson et al. | |
| 2012/0152954 A1 | 6/2012 | Bruehl et al. | |
| 2012/0199509 A1 | 8/2012 | Mckiel et al. | |
| 2013/0085244 A1 | 4/2013 | Zhao et al. | |
| 2013/0189617 A1 | 7/2013 | Merical et al. | |
| 2013/0243894 A1 | 9/2013 | Schirmer | |
| 2014/0308466 A1 | 10/2014 | Kashima et al. | |
| 2015/0125098 A1 | 5/2015 | Okamoto et al. | |
| 2015/0225151 A1 * | 8/2015 | Osborn | B32B 15/085 604/307 |

FOREIGN PATENT DOCUMENTS

| | | |
|---|---|---|
| EP | 1602350 A1 | 12/2005 |
| EP | 1827283 B1 | 9/2007 |
| EP | 2468661 A1 | 6/2012 |
| EP | 2796524 A1 | 10/2014 |
| EP | 2803713 A1 | 11/2014 |
| JP | 2011286087 A | 10/1999 |
| JP | 2007098579 | 4/2007 |
| JP | 2007156348 A | 6/2007 |
| JP | 2010077391 A | 4/2010 |
| JP | 2012003221 A | 1/2012 |
| JP | 2013135414 A | 7/2013 |
| WO | 1998055537 A1 | 12/1998 |
| WO | 200226494 A2 | 4/2002 |
| WO | 2007104513 A1 | 9/2007 |
| WO | 20080101946 A2 | 8/2008 |
| WO | 2009098261 A1 | 8/2009 |
| WO | 2009105205 A1 | 8/2009 |
| WO | 2012037180 A1 | 3/2012 |
| WO | 2013096078 A1 | 6/2013 |
| WO | 2013105524 A1 | 7/2013 |
| WO | 2013116445 A1 | 8/2013 |
| WO | 2014/088585 A1 | 6/2014 |
| WO | 2015123211 A1 | 8/2015 |

OTHER PUBLICATIONS

Jester, Randy, "Cyclic Olefin Copolymer Enhances Ployolefin Blends for Film Packaging", Plastics Technology, retrieved online Jan. 27, 2014 at www.ptonline.com/articles/cyclic-olefin-copolymer-enhances-ployolefin-blends-for-film-packaging.

Sajilata, M. G., K. Savitha, & V. R. Kanetkar "Scalping of Flavors in Packaged Foods", MS20060142, Sep. 18, 2006.

TOPAS® Advanced Polymers Brochure "Packaging" pp. 1-32.

TOPAS® Advanced Polymers Brochure TB003 "Medical" Jan. 2007.

Zeon Corporation, "Cyclo Olefin Polymer (COP): Zeonor®", retrieved online Jan. 21, 2016, at http://www.zeon.co.ip/content/200181692.pdf.

* cited by examiner

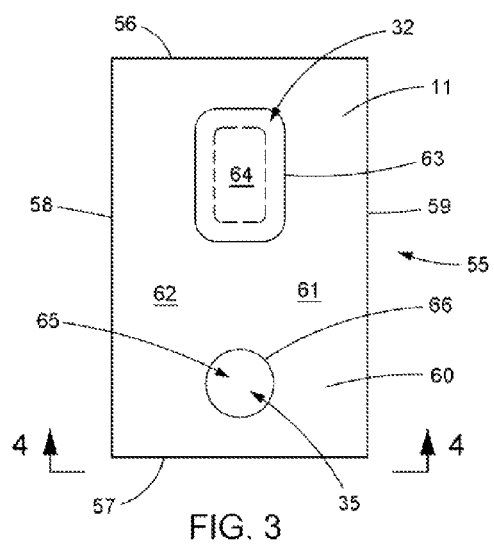
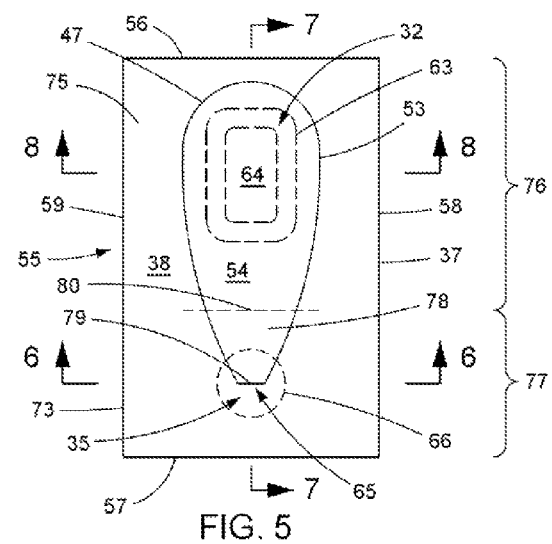
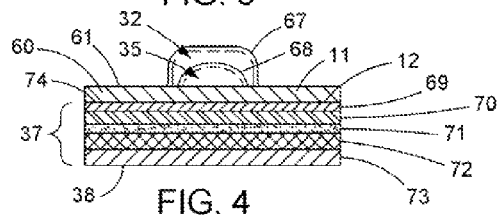
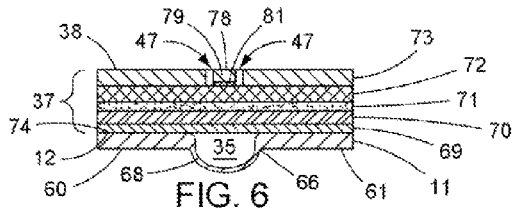

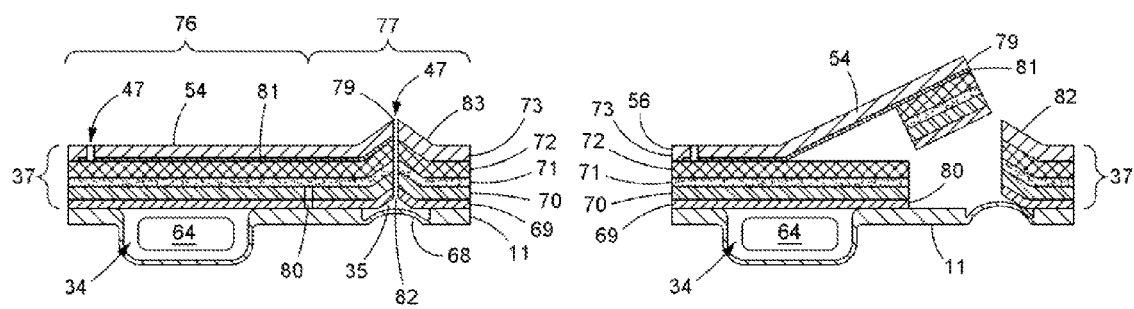
FIG. 9    FIG. 10
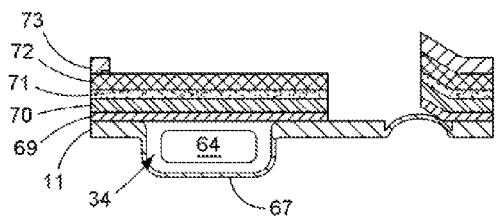    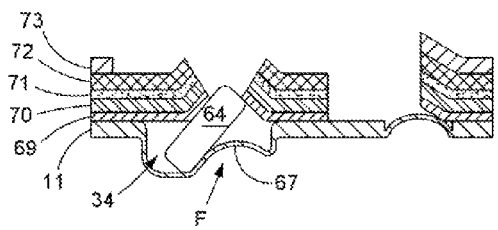
FIG. 11    FIG. 12

CHILD-RESISTANT PACKAGING

BACKGROUND

1. Technical Field

The present application relates generally to child-resistant packaging suitable for packaging potentially hazardous small articles such as a physiologically active substance such as a drug, nutritional supplement, or medical device such as a hearing aid or a component therefor such as a button battery.

2. Background Information

Pharmaceuticals in the form of various sizes and shapes of pills, caplets, capsules are often packaged in blister card packs where individual doses are accessible by peeling off the lidstock or by pushing the pharmaceutical product through an aluminum foil or paper package wall. Suitable packaging for drugs should contain the drug within the package while protecting the drug from contamination and deleterious effects from the external environment. Thus, containers such as a blister package may protect the drug or other contents from contact or exposure to unwanted materials such as microbes, insects, air, moisture, sunlight, etc. Also, the materials used in constructing pharmaceutical packaging and especially the drug contact package interior surface layer should resist migration of chemicals between the drug and the package materials. Blister pack containers are typically sealed e.g. by a heat seal to provide a hermetic barrier.

Child resistant packaging has been developed to avoid accidental poisoning and choking hazards. Typical plastic bottle containers for prescription drugs having child resistant closures requiring alignment of arrows or a combination of pressing or pulling while turning are well known. Attempts have been made to provide blister packaging which is "child resistant" i.e. packaging which is resistant to opening by a young child (up to 5 years of age). The major drawback of blister packaging is the difficulty in design of child safe blister packaging which can also be opened easily by adults. One type of child resistant blister package uses a 5"×2" card which is perforated longitudinally and has a combination of polyester film and paper which resists push through access. The card is opened by first being torn in half along a lengthwise line of perforations and then using a notch, is torn transversely to the perforation line thereby releasing the drug product. This type of package is difficult for young children to open because it requires two sequential separate steps. See, Jenkins et al., *Packaging Drugs and Pharmaceuticals*, pages 201-202, Technomic Publishing Company, (1993, Lancaster, Pa.). Accordingly, there is a continuing need for cost efficient child resistant packaging material for containing small products such as physiologically active substances and medical devices.

BRIEF SUMMARY

A blister package comprising: (a) a product which is typically small and potentially hazardous to a young child, such as a physiologically active substance or medical device or component; (b) a multilayer lidstock having: i) an inner thermoplastic heat sealable layer, preferably having a thickness of from 0.10 to 1.0 mil; ii) a first intermediate oxygen and/or moisture barrier layer e.g. an aluminum foil layer, preferably having a thickness of from 0.25 to 2 mil; iii) a second intermediate adhesive layer; iv) an outer layer which may be bite resistant e.g. a polyester layer preferably having a thickness of at least 0.75 mil or an oriented polyamide or nylon layer preferably having a thickness of at least 0.5 mil and where the outer layer has an open or closed loop shaped score line therethrough, and the adhesive layer is disposed between the first intermediate layer and the outer layer; and (v) a release coating disposed at least within the loop shape and between the first intermediate layer and the outer layer (this permits manual peelable detachment of the outer layer from the first intermediate layer); and (c) a formed blister film having at least two compartments: (i) a first blister compartment adapted for receiving the product; and (ii) a second blister compartment having a blister compartment film overlaying and spaced apart from a portion of the lidstock heat seal layer opposite a tab area portion of the score line in the polyester layer; and wherein the second blister compartment is adapted for manual inward deformation activation of separation of the lidstock from itself along the score line tab area portion; wherein the product (a) is hermetically sealed between (b) and (c) within the first blister compartment.

The inventive package is suitable for packaging small articles or products of a size capable of being inserted into a human mouth or brought into potentially hazardous contact with a child. Examples of products which may be packaged in accordance with the present invention include without limitation: physiologically active substances such as prescription or over the counter (OTC) drugs; vitamin, mineral or nutritional supplements; oral dissolvable thin strips; chewing gum e.g. nicotine gum; analgesics or liniments; medical devices such as syringes and hearing aids; sharp products such as needles, razor blades, fish hooks; hazardous materials such as batteries, pesticides, rodenticides, toxic chemicals; choking hazards such as buttons, pins, fasteners, nail clippers, etc.

According to the present invention the lidstock and/or blister films may in a preferred embodiment advantageously employ (a) an article contact layer having at least 90 wt. % of a norbornene ethylene copolymer or derivative thereof and a glass transition temperature of from 65 to 110° C.;
  (b) an oxygen barrier layer having an oxygen transmission rate of less than less than 0.01 $cm^3$/100 $inches^2$/24 hours at 1 atmosphere and 23° C.;
  (c) an intermediate adhesive layer; and
  (f) an exterior puncture-resistant protective layer;
  wherein the multilayer film has the following properties: a WVTR of less than 0.01 g/100 $inches^2$ per 24 hours at Room Temperature (RT) (23° C.) and 1 atmosphere; and a thickness of 10 mil or less. Where the above structure comprises the lidstock the exterior protective layer comprises and preferably consists essentially of polyester having a thickness of at least 0.75 mil, or oriented nylon having a thickness of at least 0.6 mil.

BRIEF DESCRIPTION OF THE DRAWINGS

FIG. 3 is a plan view of a single portion container of a double blister package in accordance with the present invention.

FIG. 4 is an end view of the container of FIG. 3 illustrating a multilayer construction.

FIG. 5 is a plan view of an opposite side of the container of FIG. 3.

FIG. 6 is a sectional view of the multilayer construction of the container of FIG. 5 taken along lines 6-6.

FIG. 9 is a sectional view of a multilayer embodiment of a child-resistant package in accordance with the present invention illustrating an initial first opening step.

FIG. 10 is a sectional view of a multilayer embodiment of a child-resistant package in accordance with the present invention illustrating a second opening step.

FIG. 11 is a sectional view of a multilayer embodiment of a child-resistant package in accordance with the present invention illustrating the product containing package following removal of a portion of the lidstock.

FIG. 12 is a sectional view of a multilayer embodiment of a child-resistant package in accordance with the present invention illustrating a third opening step which releases the product from the package.

DETAILED DESCRIPTION

Definitions and Nomenclature

Figure 1:
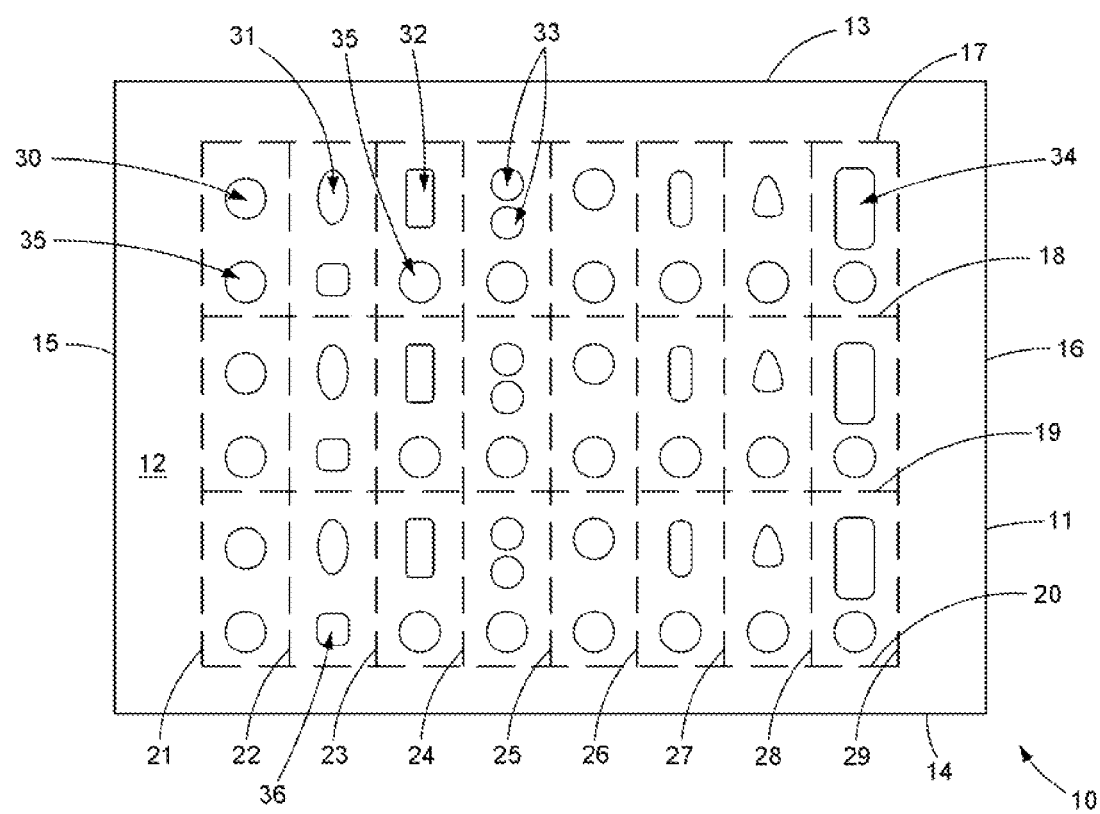
FIG. 1 is a top plan view illustrating a blister film in accordance with the present invention.

In discussing polymers, plastic films and packaging, various acronyms are used herein and they are listed below. Also, in referring to blends of polymers a colon (:) will be used to indicate that the components to the left and right of the colon are blended. In referring to film structure, a slash "/" will be used to indicate that components to the left and right of the slash are in different layers and the relative position of components in layers may be so indicated by use of the slash to indicate film layer boundaries. Acronyms and terms commonly employed herein include:

APET—amorphous polyester terephthalate
OPET—biaxially oriented polyester terephthalate
COC—a cyclic olefin copolymer such as ethylene norbornene copolymer
PE—Polyethylene (ethylene homopolymer and/or copolymer of a major portion of ethylene with one or more α-olefins)
LDPE—low density polyethylene
LLDPE—linear low density polyethylene
mLLDPE—metallocene catalyzed linear low density polyethylene
$C_2$—ethylene monomer
$C_4$—butene-1 monomer
$C_6$—hexene-1 monomer
$C_8$—octene-1 monomer
$C_{10}$—decene-1 monomer
$C_2 C_x$—a substantially linear copolymer of ethylene and an α-olefin where "x" indicates the number of carbon atoms in the comonomer.
VA—Vinyl Acetate
EVA—Copolymer of ethylene with vinyl acetate
EVOH—A saponified or hydrolyzed copolymer of ethylene and vinyl acetate
EAA—Copolymer of ethylene with acrylic acid
EMA—ethylene methacrylic acid copolymer
ionomer—an ethylene-methacrylate acid copolymer whose acid groups have been neutralized partly or completely to form a salt, preferably a zinc or sodium salt
PVDC—Polyvinylidene chloride (also includes copolymers of vinylidene chloride, especially with vinyl chloride)

The term "nanocomposite" shall mean a mixture that includes a polymer, or copolymer having dispersed therein a plurality of individual platelets obtained from an exfoliated modified clay and having oxygen barrier properties.

The term "adhesive layer," or "tie layer," refers to a layer or material placed on one or more layers to promote the adhesion of that layer to another surface. Preferably, adhesive layers are positioned between two layers of a multilayer film to maintain the two layers in position relative to each other and prevent undesirable delamination. In some embodiments a peelable tie layer may be used which is designed to have either cohesive failure or delamination from one or both adjacent layers upon application of a suitable manual force to provide an opening feature for a package made from the film. Unless otherwise indicated, an adhesive layer can have any suitable composition that provides a desired level of adhesion with the one or more surfaces in contact with the adhesive layer material. Optionally, an adhesive layer placed between a first layer and a second layer in a multilayer film may comprise components of both the first layer and the second layer to promote simultaneous adhesion of the adhesive layer to both the first layer and the second layer to opposite sides of the adhesive layer.

As used herein, unless otherwise indicated, the phrases "seal layer," "sealing layer," "heat seal layer," and "sealant layer," refer to a film layer, or layers, involved in the sealing of the film: to itself; to another film layer of the same film or another film; and/or to another article which is not a film e.g. a tray. In general, the sealant layer is a surface layer i.e. an exterior or an interior layer of any suitable thickness, that provides for the sealing of the film to itself or another layer. With respect to packages having only fin-type seals, as opposed to lap-type seals, the phrase "sealant layer" generally refers to the interior surface film layer of a package. The inside layer frequently can also serve as an article contact layer in the packaging of articles.

"Polyolefin" is used herein broadly to include polymers such as polyethylene, ethylene-alpha olefin copolymers (EAO), polypropylene, polybutene, ethylene copolymers having a majority amount by weight of ethylene polymerized with a lesser amount of a comonomer such as vinyl acetate, and other polymeric resins falling in the "olefin" family classification. Polyolefins may be made by a variety of processes well known in the art including batch and continuous processes using single, staged or sequential reactors, slurry, solution and fluidized bed processes and one or more catalysts including for example, heterogeneous and homogeneous systems and Ziegler, Phillips, metallocene, single site and constrained geometry catalysts to produce polymers having different combinations of properties. Such polymers may be highly branched or substantially linear and the branching, dispersity and average molecular weight and may vary depending upon the parameters and processes chosen for their manufacture in accordance with the teachings of the polymer arts.

"Polyethylene" is the name for a polymer whose basic structure is characterized by the chain $-(CH_2-CH_2-)_n$. Polyethylene homopolymer is generally described as being a solid which has a partially amorphous phase and partially crystalline phase with a density of between 0.915 to 0.970 g/cm$^3$. The relative crystallinity of polyethylene is known to affect its physical properties. The amorphous phase imparts flexibility and high impact strength while the crystalline phase imparts a high softening temperature and rigidity.

Unsubstituted polyethylene is generally referred to as high density homopolymer and has a crystallinity of 70 to 90 percent with a density between about 0.96 to 0.97 g/cm$^3$. Most commercially utilized polyethylenes are not unsubstituted homopolymer but instead have $C_2$-$C_8$ alkyl groups attached to the basic chain. These substituted polyethylenes are also known as branched chain polyethylenes. Also, commercially available polyethylenes frequently include other substituent groups produced by copolymerization. Branching with alkyl groups generally reduces crystallinity, density and melting point. The density of polyethylene is recognized as being closely connected to the crystallinity. The physical properties of commercially available polyethylenes are also affected by average molecular weight and molecular weight distribution, branching length and type of substituents.

The phrase "hazardous article" is used to mean an article which is capable of harming a young child by contact, ingestion or choking of one or more of such articles. Examples of small hazardous articles include drugs, medicines, mineral or vitamin supplements, other physiological substances such as herbs, hormone extracts, which may either alone or in multiple doses cause harm, batteries, poisons, substances which may cause skin or eye irritation, burns, blindness, abrasions, cuts, punctures, wounds or present other hazards, small items which present choking hazards or which may be harmful if inhaled or inserted into a nostril. The phrase "small hazardous article" means a product or article which fits inside a small parts test fixture which is a cylinder tube that is 1.25 inches in diameter and between 1 and 2.25 inches deep. It is designed to mimic a young child's mouth and pharynx. Any object that fits in the tube is considered small.

People skilled in the art generally refer to several broad categories of polymers and copolymers as "polyethylene." Placement of a particular polymer into one of these categories of "polyethylene" is frequently based upon the density of the "polyethylene" and often by additional reference to the process by which it was made since the process often determines the degree of branching, crystallinity and density. In general, the nomenclature used is nonspecific to a compound but refers instead to a range of compositions. This range often includes both homopolymers and copolymers.

For example, "high density" polyethylene (HDPE) is ordinarily used in the art to refer to both (a) homopolymers of densities between about 0.960 to 0.970 g/cm$^3$ and (b) copolymers of ethylene and an α-olefin (usually 1-butene or 1-hexene) which have densities between 0.940 and 0.958 g/cm$^3$. HDPE includes polymers made with Ziegler or Phillips type catalysts and is also said to include high molecular weight "polyethylenes." In contrast to HDPE, whose polymer chain has some branching, are "ultra high molecular weight polyethylenes" which are essentially unbranched specialty polymers having a much higher molecular weight than the high molecular weight HDPE.

Hereinafter, the term "polyethylene" will be used (unless indicated otherwise) to refer to ethylene homopolymers as well as copolymers of ethylene with α-olefins and the term will be used without regard to the presence or absence of substituent branch groups.

Another broad grouping of polyethylene is "high pressure, low density polyethylene" (LDPE). LDPE is used to denominate branched homopolymers having densities between 0.915 and 0.930 g/cm$^3$. LDPEs typically contain long branches off the main chain (often termed "backbone") with alkyl substituents of 2 to 8 carbon atoms.

Linear Low Density Polyethylene (LLDPE) are copolymers of ethylene with alpha-olefins having densities from 0.915 to 0.940 g/cm$^3$. The α-olefin utilized is usually 1-butene, 1-hexene, or 1-octene and Ziegler-type catalysts are usually employed (although Phillips catalysts are also used to produce LLDPE having densities at the higher end of the range, and metallocene and other types of catalysts are also employed to produce other well known variations of LLDPEs). An LLDPE produced with a metallocene or constrained geometry catalyst is often referred to as "mLLDPE".

Ethylene α-olefin copolymers are copolymers having an ethylene as a major component copolymerized with one or more alpha olefins such as octene-1, hexene-, or butene-1 as a minor component. EAOs include polymers known as LLDPE, VLDPE, ULDPE, and plastomers and may be made using a variety of processes and catalysts including metallocene, single-site and constrained geometry catalysts as well as Ziegler-Natta and Phillips catalysts.

Very Low Density Polyethylene (VLDPE) which is also called "Ultra Low Density Polyethylene" (ULDPE) comprise copolymers of ethylene with α-olefins, usually 1-butene, 1-hexene or 1-octene and are recognized by those skilled in the art as having a high degree of linearity of structure with short branching rather than the long side branches characteristic of LDPE. However, VLDPEs have lower densities than LLDPEs. The densities of VLDPEs are recognized by those skilled in the art to range between 0.860 and 0.915 g/cm$^3$. Sometimes VLDPEs having a density less than 0.900 g/cm.sup.3 are referred to as "plastomers".

Polyethylenes may be used alone, in blends and/or with copolymers in both monolayer and multilayer films for packaging applications.

As used herein, the term "modified" refers to a chemical derivative e.g. one having any form of anhydride functionality, such as anhydride of maleic acid, crotonic acid, citraconic acid, itaconic acid, fumaric acid, etc., whether grafted onto a polymer, copolymerized with a polymer, or otherwise functionally associated with one or more polymers, and is also inclusive of derivatives of such functionalities, such as acids, esters, and metal salts derived therefrom. Another example of a common modification is acrylate modified polyolefins.

As used herein, terms identifying polymers, such as e.g. "polyamide" or "polypropylene," are inclusive of not only polymers comprising repeating units derived from monomers known to polymerize to form a polymer of the named type, but are also inclusive of comonomers, as well as both unmodified and modified polymers made by e.g. derivitization of a polymer after its polymerization to add functional groups or moieties along the polymeric chain. Furthermore, terms identifying polymers are also inclusive of "blends" of such polymers. Thus, the terms "polyamide polymer" and "nylon polymer" may refer to a polyamide-containing homopolymer, a polyamide-containing copolymer or mixtures thereof.

The term "polyamide" means a high molecular weight polymer having amide linkages $(-CONH-)_n$ which occur along the molecular chain, and includes "nylon" resins which are well known polymers having a multitude of uses including utility as packaging films, bags, and pouches. See, e.g. Modern Plastics Encyclopedia, 88 Vol. 64, No. 10A, pp 34-37 and 554-555 (McGraw-Hill, Inc., 1987) which is hereby incorporated by reference. Polyamides are preferably selected from nylon compounds approved for use in producing articles intended for use in processing, handling, and packaging food or drugs.

The term "nylon" as used herein it refers more specifically to synthetic polyamides, either aliphatic or aromatic, either in crystalline, semi-crystalline, or amorphous form characterized by the presence of the amide group —CONH. It is intended to refer to both polyamides and co-polyamides.

Thus the terms "polyamide" or "nylon" encompass both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Preferably, polymers are selected from compositions approved as safe for producing articles intended for use in processing, handling and packaging of food or drugs, such as nylon resins approved by the U.S. Food and Drug Administration provided at 21 CFR .sctn.177.1500 ("Nylon resins"), which is incorporated herein by reference. Examples of these nylon polymeric resins for use in food or drug packaging and processing include: nylon 66, nylon 610, nylon 66/610, nylon 6/66, nylon 11, nylon 6, nylon 66T, nylon 612, nylon 12, nylon 6/12, nylon 6/69, nylon 46, nylon 6-3-T, nylon MXD-6, nylon MXDI, nylon 12T and nylon 6I/6T disclosed at 21 CFR .sctn.177.1500. Examples of such polyamides include nylon homopolymers and copolymers such as those selected form the group consisting of nylon 4,6 (poly(tetramethylene adipamide)), nylon 6 (polycaprolactam), nylon 6,6 (poly(hexamethylene adipamide)), nylon 6,9 (poly(hexamethylene nonanediamide)), nylon 6,10 (poly (hexamethylene sebacamide)), nylon 6,12 (poly(hexamethylene dodecanediamide)), nylon 6/12 (poly(caprolactam-co-dodecanediamide)), nylon 6,6/6 (poly(hexamethylene adipamide-co-caprolactam)), nylon 66/610 (e.g., manufactured by the condensation of mixtures of nylon 66 salts and nylon 610 salts), nylon 6/69 resins (e.g., manufactured by the condensation of epsilon-caprolactam, hexamethylenediamine and azelaic acid), nylon 11 (polyundecanolactam), nylon 12 (polylauryllactam) and copolymers or mixtures thereof.

In use of the term "amorphous nylon copolymer," the term "amorphous" as used herein denotes an absence of a regular three-dimensional arrangement of molecules or subunits of molecules extending over distances which are large relative to atomic dimensions. However, regularity of structure may exist on a local scale. See, "Amorphous Polymers," Encyclopedia of Polymer Science and Engineering, 2nd Ed., pp. 789-842 (J. Wiley & Sons, Inc. 1985). In particular, the term "amorphous nylon copolymer" refers to a material recognized by one skilled in the art of differential scanning calorimetry (DSC) as having no measurable melting point (less than 0.5 cal/g) or no heat of fusion as measured by DSC using ASTM 3417-83. The amorphous nylon copolymer may be manufactured by the condensation of hexamethylenediamine, terephthalic acid, and isophthalic acid according to known processes. Amorphous nylons also include those amorphous nylons prepared from condensation polymerization reactions of diamines with dicarboxylic acids. For example, an aliphatic diamine is combined with an aromatic dicarboxylic acid, or an aromatic diamine is combined with an aliphatic dicarboxylic acid to give suitable amorphous nylons.

As used herein, "EVOH" refers to ethylene vinyl alcohol copolymer. EVOH is otherwise known as saponified or hydrolyzed ethylene vinyl acetate copolymer, and refers to a vinyl alcohol copolymer having an ethylene comonomer. EVOH is prepared by the hydrolysis (or saponification) of an ethylene-vinyl acetate copolymer. The degree of hydrolysis is preferably from about 50 to 100 mole percent, more preferably, from about 85 to 100 mole percent, and most preferably at least 97%. It is well known that to be a highly effective oxygen barrier, the hydrolysis-saponification must be nearly complete, i.e. to the extent of at least 97%. EVOH is commercially available in resin form with various percentages of ethylene and there is a direct relationship between ethylene content and melting point. For example, EVOH having a melting point of about 175° C. or lower is characteristic of EVOH materials having an ethylene content of about 38 mole % or higher. EVOH having an ethylene content of 38 mole % has a melting point of about 175° C. With increasing ethylene content the melting point is lowered. Also, EVOH polymers having increasing mole percentages of ethylene have greater gas permeabilities. A melting point of about 158° C. corresponds to an ethylene content of 48 mole ° A). EVOH copolymers having lower or higher ethylene contents may also be employed. It is expected that processability and orientation would be facilitated at higher contents; however, gas permeabilities, particularly with respect to oxygen, may become undesirably high for certain packaging applications which are sensitive to microbial growth in the presence of oxygen. Conversely lower contents may have lower gas permeabilities, but processability and orientation may be more difficult.

As used herein, the term "polyester" refers to synthetic homopolymers and copolymers having ester linkages between monomer units which may be formed by condensation polymerization methods. Polymers of this type are preferable aromatic polyesters and more preferable, homopolymers and copolymers of poly(ethylene terephthalate), poly(ethylene isophthalate), poly(butylene terephthalate), poly(ethylene naphthalate) and blends thereof. Suitable aromatic polyesters may have an intrinsic viscosity between 0.60 to 1.0, preferably between 0.60 to 0.80.

The terms "heat sealing layer" or "sealant layer" are used interchangeably to refer to a layer which is heat sealable i.e., capable of fusion bonding by conventional indirect heating means which generate sufficient heat on at least one film contact surface for conduction to the contiguous film contact surface and formation of a bond interface therebetween without loss of the film integrity. The bond interface between contiguous inner layers preferably has sufficient physical strength to withstand the packaging process and subsequent handling. Advantageously, the bond interface is preferably sufficiently thermally stable to prevent gas or liquid leakage therethrough when exposed to above or below ambient temperatures e.g. during one or more of the following: packaging operations, storage, handling, and transport. Heat seals may be designed to meet different conditions of expected use and various heat seal formulations are known in the art and may be employed with the present invention. Preferably the article contact or heat seal layer is heat sealable to itself, but may be sealable to other objects, films or layers e.g to a tray when used as a lidding film, or to an outer layer in a lap seal or in certain tray overwrap embodiments.

Article Contact/Heat Sealing Layers

A variety of article contact/heat seal layers may be employed with the present invention and these may include without limitation polyolefins such as polypropylene or polyethylene, PVC, ACLAR® coated PVC, acrylonitrile polymers, etc. It is preferable that the oxygen and water barrier film of the present invention have an article contact layer containing ethylene norbornene copolymer which is a cyclic olefin copolymer (COC). COCs are commercially available from Topas as an amorphous, transparent copolymer of ethylene with norbornene made by polymerization with a metallocene catalyst. These commercially available COCs reportedly have high transparency and gloss, excellent moisture barrier and aroma barrier properties, a variable glass transition point between 65 to 178° C., high stiffness, high strength, excellent biocompatibility and inertness and easy to exclude and thermoform. COCs have previously been used for pharmaceutical, medical and food packaging applications including use in coextruded cast films for blister packaging and may be blended with polyethylene. For the present invention, ethylene norbornene copolymers having a glass transition temperature ($T_g$) of 65-138° C. or an ethylene-norbornene comonomer content of 20-40 mole % ethylene and 30-60 mole % norbornene is required. These ethylene norbornene copolymers are believed to comprise essentially only polymeric units derived from ethylene and norbornene comonomers. Other reported properties for the ethylene norbornene copolymers used in the present invention include a density (A) of 1.02 g/cm$^3$; a melt volume ratio (MVR) of 1.0-12.0 cm$^3$/10 min. at 230° C., 2.16 kg load, and 1.0-2.0 at 190° C., 2.16 kg load (ISO 1133); a melt index of 0.1 to 1.9 at 190° C., 2.16 kg load (reported as calculated from ISO 1133 MVR using a melt density of 0.92). Other properties of Topas cyclic olefin copolyer are described in a March 2006 brochure "Topas® Cylcic Olefin Copolymers" available from Topas Advanced Polymers on its website: http://www.topas.com/sites/default/files/files/topa_s product-brochure_english.pdf which brochure is hereby incorporated by reference in its entirety. In the present invention the contact layer may also function as a heat sealing or heat sealable layer to facilitate formation of hermetically sealed packages. In one preferred embodiment, the article contact layer comprises at least 90 wt. % of ethylene norbornene COC, more preferably at least 95 wt. ° A), and most preferably 100 wt. ° A). It may be blended with up to 10 wt. %, preferably up to 5 wt. % and more preferably up to 2.5 wt. % of compatible polymers such as polyolefins e.g. polyethylene, LLDPE, EAO copolymers, LDPE, colorants, processing aids and the like.

Barrier Layers

The barrier layer preferably functions both as a gas barrier layer, and as a moisture barrier layer, although these functions may be provided by separate layers. The gas barrier layer is preferably an oxygen barrier layer, and is preferably a core layer positioned between and protected by surface layers. For example, the oxygen barrier layer can be in contact with a first surface layer and an adhesive layer or may be sandwiched between two tie layers and/or two surface layers.

The oxygen barrier is preferably selected to provide an oxygen permeability sufficiently diminished to protect the packaged article from undesirable deterioration or oxidative processes. For example, a film may comprise an oxygen barrier having an oxygen permeability that is low enough to prevent oxidation of oxygen sensitive articles and substances to be packaged in the film e.g. oxygen sensitive articles such as transdermal patches e.g. nicotine or fentanyl patches or oxygen sensitive collection samples such as blood which may be collected e.g. in a microcassette device. Preferably a multilayer packaging film in accordance with the present invention will have an oxygen barrier of less than or equal to 0.016 cm$^3$/m$^2$ per 24 hours at 1 atmosphere.

The water or moisture barrier is preferably selected to provide a moisture permeability sufficiently diminished to protect the packaged article from undesirable deterioration. For example, a film may comprise an water barrier having an moisture permeability that is low enough to prevent deleterious effects upon packaged articles such as transdermal drug patches or other moisture sensitive products. A preferred film according to the present invention will have a water or moisture transmission rate (WVTR) of less than 0.016 g/meter$^2$ per 24 hours at Room Temperature (RT) (23° F.) and 1 atmosphere.

The oxygen and moisture barrier layer can comprise any suitable material. An oxygen barrier layer can comprise EVOH, polyvinylidene chloride, polyamide, polyester, polyalkylene carbonate, polyacrylonitrile, nanocomposite, a metallized film such as aluminum vapor deposited on a polyolefin, etc., as known to those of skill in the art. Suitable moisture barrier layers include aluminum foil, PVDC, or polyolefins such as LDPE or LLDPE. It is desirable that the thickness of the barrier layer be selected to provide the desired combination of the performance properties sought e.g. with respect to oxygen permeability, and delamination resistance, and water barrier properties. Suitable thicknesses in multilayer films for aluminum foil is from about 0.25 to 2.0 mil and for polymeric O$_2$ barrier are typically less than 15%, e.g. from 3 to 13% of the total film thickness and preferably less than about 10% of the total thickness of the multilayer film. Greater thicknesses may be employed however oxygen barrier polymers tend to be relatively expensive and therefore it is expected that less costly materials will be used in other layers to impart desirable properties once a suitable thickness is used to achieve the desired gas barrier property for the film layer combination. For example, the thickness of a core oxygen barrier layer may advantageously be less than about 0.45 mil (10.16 microns) and greater than about 0.05 mil (1.27 microns), including 0.10, 0.20, 0.25, 0.30, 0.40, or 0.45 mil thick.

The oxygen barrier layer of a film may comprise aluminum foil, or EVOH, although oxygen barrier layers comprising polyvinylidene chloride-vinyl chloride copolymer (PVDC or VDC-VC) or vinylidene chloride-methylacrylate copolymer (VDC-MA) as well as blends thereof, can also be used. One suitable EVOH barrier material is a 44 mol % EVOH resin E151B sold by Eval Company of America, under the trade name Eval®LC-E151B. Another example of an EVOH that may be acceptable can be purchased from Nippon Gohsei under the trade name Soarnol® AT (44 mol % ethylene EVOH).

For packaging of oxygen sensitive articles, an oxygen (O$_2$) permeability of less than about 310 cm$^3$/m$^2$ for a 24 hour period at 1 atmosphere, 0% relative humidity and 23° C., and preferably less than 75 cm$^3$/m$^2$, more preferably less than 20 cm$^3$/m$^2$. The thickness of the core layer may be varied and beneficially may be from about 0.05 to about 0.60 mils (1.3-15.2 microns).

A bulk layer may be provided to provide additional functionality such as stiffness or heat sealability or to improve machinability, cost, flexibility, barrier properties, etc. Preferred bulk layers comprise one or more polyolefins such as polyethylene, ethylene-alpha olefin copolymers (EAO), polypropylene, polybutene, ethylene copolymers having a majority amount by weight of ethylene polymerized with a lesser amount of a comonomer such as vinyl acetate, and other polymeric resins falling in the "olefin" family classification. The bulk layer may be of any suitable thickness from 0.1 to 7 mils or may even be omitted for use in certain applications, but is preferably present to improve especially stiffness/flexibility properties and heat sealability.

Abuse-Resistant Outer Layer

Since it is seen by the user/consumer, in both the monolayer and multilayer embodiments of the invention the exterior surface of the film should enhance optical properties of the film and may preferably have high gloss. Also, it should withstand contact with sharp objects, teeth, and provide abrasion resistance, and for these reasons it is often termed the abuse-resistant layer. This exterior abuse-resistant layer should be resistant to opening by young children. As the exterior surface layer of the film, this layer most often is also the exterior layer of any package, or other container made from the film, and is therefore subject to handling and abuse e.g. from equipment during packaging, and from rubbing against other packages and shipping containers and storage shelves during transport and storage. This contact causes abrasive forces, stresses and pressures which may abrade away the film, causing defects to printing, diminished optical characteristics or even punctures or breaches in the integrity of the package. Therefore the exterior surface layer is made from materials chosen to be resistant to abrasive and puncture forces and other stresses and abuse which the packaging may encounter during use. The exterior surface layer should be easy to machine (i.e. be easy to feed through and be manipulated by machines e.g. for conveying, packaging, printing or as part of the film or bag manufacturing process). Suitable stiffness, flexibility, flex crack resistance, modulus, tensile strength, coefficient of friction, printability, and optical properties are also frequently designed into exterior layers by suitable choice of materials. This layer may also be chosen to have characteristics suitable for creating desired heat seals which may be heat resistance to burn through e.g. by impulse sealers or may be used as a heat sealing surface in certain package embodiments e.g. using overlap seals. The exterior layer must be tough to impart resistance to opening by children e.g. preventing the package from being opened by a child's bite. A preferred exterior child resistant layer comprise polyester film, preferably oriented polyester terephthalate, preferably at least 0.9 mil in thickness. Suitable exterior surface layers may comprise: oriented polyester or oriented nylon. Oriented films of this or any other layer may be either uni-axially or bi-axially oriented.

The exterior layer thickness is typically 0.5 to 2.0 mils. Thinner layers may be less effective for abuse resistance, however thicker layers, though more expensive, may advantageously be used to produce films having unique highly desirable puncture resistance and/or abuse resistance properties.

Intermediate Layers

An intermediate layer is any layer between the exterior layer and the interior layer and may include oxygen barrier layers, tie layers or layers having functional attributes useful for the film structure or its intended uses. Intermediate layers may be used to improve, impart or otherwise modify a multitude of characteristics: e.g. printability for trap printed structures, machinability, tensile properties, flexibility, stiffness, modulus, designed delamination, easy opening features, tear properties, strength, elongation, optical, moisture barrier, oxygen or other gas barrier, radiation selection or barrier e.g to ultraviolet wavelengths, etc. Suitable intermediate layers may include: adhesives, adhesive polymers, paper, oriented polyester, amorphous polyester, polyamide, polyolefin, nylon, polypropylene, or copolymers, blends or derivatives thereof. Suitable polyolefins may include: polyethylene, ethylene-alpha olefin copolymers (EAO), polypropylene, polybutene, ethylene copolymers having a majority amount by weight of ethylene polymerized with a lesser amount of a comonomer such as vinyl acetate, and other polymeric resins falling in the "olefin" family classification, LDPE, HDPE, LLDPE, EAO, ionomer, EMA, EAA, modified polyolefins e.g. anhydride grafted ethylene polymers, etc.

Tie Layers

In addition to the exterior layer, the interior layer, and intermediate layer such as a rupture and/or barrier layer, a multilayer packaging film can further comprise one or more adhesive layers, also known in the art as "tie layers," which can be selected to promote the adherence of adjacent layers to one another in a multilayer film and prevent undesirable delamination. A multifunctional layer is preferably formulated to aid in the adherence of one layer to another layer without the need of using separate adhesives by virtue of the compatibility of the materials in that layer to the first and second layers. In some embodiments, adhesive layers comprise materials found in both the first and second layers. The adhesive layer may suitably be less than 10% and preferably between 2% and 10% of the overall thickness of the multilayer film. Adhesive resins are often more expensive than other polymers so the tie layer thickness is usually kept to a minimum consistent with the desired effect. In one embodiment, a multilayer film comprises a multilayer structure comprising a first adhesive layer positioned between and in direct contact with the exterior layer and a core oxygen barrier layer; and preferably and optionally has a second tie layer between and in direct contact with the same core oxygen barrier layer and the interior layer to produce a five layer film. Adhesive layers may include modified e.g. anhydride modified polymers e.g. polyolefins such as polyethylenes or ethylene copolymers such as EVA and may also be primers or specialty adhesive resins.

Multilayer films can comprise any suitable number of tie or adhesive layers of any suitable composition. Various adhesive layers are formulated and positioned to provide a desired level of adhesive between specific layers of the film according to the composition of the layers contacted by the tie layers.

For example adhesive layers in contact with a layer comprising a polyester, such as PET, preferably comprise a suitable blend of polyolefins with other adhesive polymers. One preferred component of an adhesive layer in contact with a PET polyester layer is EMAC SP 1330 (which reportedly has: a density of 0.948 g/cm.sup.3; melt index of 2.0 g/10 min.; a melting point of 93.degree. C.; is at softening point of 49° C.; and a methylacrylate (MA) content of 22%).

The interior, intermediate or tie layers of the lidstock and blister film may be formed of any suitable thermoplastic materials, for example, polyamides, polystyrenes, styrenic copolymers e.g. styrene-butadiene copolymer, polyolefins, and in particular members of the polyethylene family such as LLDPE, VLDPE, HDPE, LDPE, ethylene vinyl ester copolymer or ethylene alkyl acrylate copolymer, polypropylenes, ethylene-propylene copolymers, ionomers, polybutylenes, alpha-olefin polymers, polyesters, polyurethanes, polyacrylamides, anhydride-modified polymers, acrylate-modified polymers, polylactic acid polymers, or various blends of two or more of these materials.

In another embodiment, the exterior and/or one or more intermediate layers can comprise or consist essentially of a nylon composition. Preferably, the nylon composition comprises at least one semi-crystalline nylon homopolymer or copolymer such as nylon 6, 11, 12, 66, 6/12, 6/69, 6/66, MXD6, or an amorphous nylon such as nylon 6I/6T copolymer or blends thereof.

In another embodiment of the invention one or more of the exterior and/or one or more intermediate layers comprises at least one polyester polymer. Preferred polyester polymers comprise aromatic polyesters and more preferably, are homopolymers or copolymers of poly (ethylene terephthalate) (PET), poly (ethylene naphthalate) and blends thereof. Suitable polyesters may have an intrinsic viscosity of about 0.60 to about 1.2, preferably between 0.60 to 0.80. The polyester may be an aliphatic polyester resin, but is preferably an aromatic polyester resin. For example, polyester materials can be derived from dicarboxylic acid components, including terephthalic acid and isophthalic acid as preferred examples, and also dimers of unsaturated aliphatic acids. Examples of a diol component as another component for synthesizing the polyester may include: polyalkylene glycols, such as ethylene glycol, propylene glycol, tetramethylene glycol, neopentyl glycol, hexamethylene glycol, diethylene glycol, poly-ethylene glycol and polytetra methylene oxide glycol; 1,4-cyclohexane-dimethanol, and 2-alkyl-1,3-propanediol. More specifically, examples of dicarboxylic acids constituting the polyester resin may include: terephthalic acid, isophthalic acid, phthalic acid, 5-t-butylisophthalic acid, naphthalenedicarboxylic acid, diphenyl ether dicarboxylic acid, cyclohexane-dicarboxylic acid, adipic acid, oxalic acid, malonic acid, succinic acid, azelaic acid, sebacic acid, and dimer acids comprising dimers of unsaturated fatty acids. These acids may be used singly or in combination of two or more species. Examples of diols constituting the polyester resin may include: ethylene glycol, propylene glycol, tetramethylene glycol, neopentyl glycol, hexamethylene glycol, diethylene glycol, polyalkylene glycol, 1,4-cyclohexane-dimethanol, 1,4-butanediol, and 2-alkyl-1,3-propane diol. These diols may be used singly or in combination of two or more species.

Polyester compositions that comprise an aromatic polyester resin comprising an aromatic dicarboxylic acid component can be preferred in some aspects, including, e.g., polyesters between terephthalic acid (as a dicarboxylic acid) and diols having at most 10 carbon atoms, such as polyethylene terephthalate and polybutylene terephthalate. Particularly preferred examples thereof may include: copolyesters obtained by replacing a portion, preferably at most 30 mol %, more preferably at most 15 mol %, of the terephthalic acid with another dicarboxylic acid, such as isophthalic acid; copolyesters obtained by replacing a portion of the diol component such as ethylene glycol with another diol, such as 1,4-cyclohexane-dimethanol (e.g., "Voridian 9921", made by Voridian division of Eastman Chemical Co.); and polyester-polyether copolymers comprising the polyester as a predominant component (e.g., polyester-ether between a dicarboxylic acid component principally comprising terephthalic acid or/and its ester derivative and a diol component principally comprising tetramethylene glycol and tetramethylene oxide glycol, preferably containing the polytetra methylene oxide glycol residue in a proportion of 10-15 wt. %). It is also possible to use two or more different polyester resins in mixture. Examples of preferred polyesters are available under the trademarks Voridian 9663, Voridian 9921 and EASTAR® Copolyester 6763, all from Eastman Chemical Company, Kingsport, Tenn., U.S.A.

Optional Additives to Layers

Various additives may be included in the polymers utilized in one or more of the exterior, interior and intermediate or tie layers of packaging comprising the same. For example, a layer may be coated with an anti-block powder. Also, conventional antioxidants, antiblock additives, polymeric plasticizers, acid, moisture or gas (such as oxygen) scavengers, slip agents, colorants, dyes, pigments, organoleptic agents, fillers such as calcium carbonate or carbon black, antimicrobial agents and mixtures thereof may be added to one or more film layers of the film or it may be free from such added ingredients. If the exterior layer is corona treated, preferably no slip agent will be used, but it will contain or be coated with an anti-block powder or agent such as silica or starch. Processing aides are typically used in amounts less than 10%, less than 7% and preferably less than 5% of the layer weight. A processing aid for use in the outer layer of the film may include one or more of fluoroelastomers, stearamides, erucamides, and silicates.

Preferred films may also provide a beneficial combination of one or more or all of the properties including low haze, high gloss, good machinability, good mechanical strength and good barrier properties including high barriers to oxygen and water permeability. Suitable barrier properties may have values of WVTR less than or equal to 0.03 g/100 in$^2$/24 hours at 1 atmosphere and RT; and/or O$_2$TR values of less than or equal to 10 cm$^3$/100 in$^2$/24 hours at 1 atmosphere and RT. Preferred barrier property values are WVTR 0.001 g/100 in$^2$/24 hours at 1 atmosphere and RT, and/or O$_2$TR values of less than or equal to 0.001 cm$^3$/100 in$^2$/24 hours at 1 atmosphere and RT.

Methods of Manufacture

The blister monolayer or multilayer film and the multilayer lidstock components and structures may be made by conventional processes. These processes to produce flexible films may include e.g. cast or blown film processes, coating lamination, adhesive lamination and conventional forming, scoring and/or cutting operations.

Unless specifically noted the polymers defined herein are "unmodified" by any intentional grafting or copolymerization with modifying moieties such as dienes, rubber moieties or acrylic acids. However, the polymers may contain chemicals or additives in small amounts (typically under 1% by weight based on the weight of the polymer) which are present as by-products of the polymer manufacturing process or otherwise added by polymer manufacturers including e.g. catalyst residues, antioxidants, stabilizers, antiblock materials and the like.

Reported and/or measured properties of suitable polymers including those used in the examples below. Exact and Escorene polymers are the commercial designations of polymers available from Exxon Chemical Company of Houston, Tex., U.S.A. Affinity and Attane polymers are the commercial designations of polymers available from Dow Chemical Company of Midland, Mich., U.S.A. Surlyn and Elvax are the commercial designations of polymers available from Dupont, U.S.A.

One or more functional properties may be contributed by one or more layers including desired levels of heat sealability, optical properties e.g. transparency, gloss, haze, abrasion resistance, coefficient of friction, tensile strength, flex crack resistance, puncture resistance, controlled rupture, abrasion resistance, printability, colorfastness, flexibility, dimensional stability, barrier properties to gases such as oxygen, or to moisture, light of broad or narrow spectrum including e.g. uv resistance, etc. Use of metal foils and metalized films are also contemplated. A metal foil laminate with an outer layer of polyethylene terephthalate, a core layer of metal foil and an inner layer of polyethylene is preferred. In this arrangement, the polyethylene terephthalate layer serves as a child-resistant, protective layer to the foil, and the polyethylene layer facilitates sealing. The foil is an excellent barrier to materials, organisms, oxygen, moisture and light.

In accordance with the present invention, the inventive packaging film may utilize a gas barrier layer such as aluminum foil, polyvinylidene chloride copolymers such as saran, or ethylene vinyl alcohol copolymers which provide high barriers to gas permeability.

In accordance with the present invention, the inventive packaging film may utilize a moisture barrier layer such as aluminum foil, polyvinylidene chloride copolymers such as saran, or polyolefin materials such as LDPE which impede moisture vapor permeation.

Adhesives useful in the present invention include permanent adhesives, modified polymer adhesives and polymer resins commonly available from many commercial sources. It is contemplated that acrylic and anhydride modified polymers may be employed as well as many adhesives which may be selected depending upon other material selections for other functional layers such as the oxygen and/or moisture barrier layer(s) as well as the exterior abuse resistant or protecting layer as well as heat sealing layer(s).

Additives and processing aides; natural and synthetic colorants, pigments and dyes; fillers such as calcium carbonate or carbon black, antimicrobial agents may be incorporated into or coated on one or more layers of the multilayer films of the present invention.

Film Thickness

Preferably, for the packaging lidstock and blister films each film has a total thickness of less than about 10 mils, more preferably the film has a total thickness of from about 1.0 to 10 mils (25-250 microns (p)). Advantageously many lidstock embodiments may have a thickness from about 1 to 5 mils, with certain typical embodiments being from about 2 to 3.5 mils. Advantageously many blister film embodiments may have an initial non-formed thickness from about 4 to 25 mils, with certain typical embodiments being from about 8 to 16 mils. For example, entire monolayer or multilayer films or any single layer of a multilayer film can have any suitable thicknesses, including 1, 2, 3, 4, 5, 6, 7, 8, 9, 10, 11, 12, 13, 14, 15, 16, 17, 18, 19, 20, 21, 22, 23, 24, or 25 mils, or any increment of 0.1 or 0.01 mil therebetween. Although suitable lidstock films for packaging drugs as thick as 5 mils (127 microns) or higher, or as thin as 1 mil (25.4 microns) or less may be made, it is expected that the most common films will be between about 1.5-4 mil (38-102 microns). Such films may have good abuse resistance and machinability. Similarly, monolayer or multilayer blister films preferably have a non-formed thickness of between about 8 to 16 mils (203-406 microns). In certain embodiments it may be advantageous to utilize blister films having a thickness of up to 25 mil or more. Depending upon the materials chosen and desire for barrier properties and the size and dimensions of the blister compartments, the thickness in the formed areas will thin out and be less, but can be designed as needed to have the desired moisture vapor and oxygen barrier properties.

Exemplary of commercially available LDPE resin suitable for use in the present invention includes, but are not limited to Equistar 216-000 LDPE resin and Dow 4012 LDPE. Exemplary of commercially available EAA resin for use in the present invention includes, but is not limited to Dupont 3990-L, which is supplied by Dupont de Nemours (DuPont). Exemplary of commercially available ionomer resin for use in the present invention includes, but is not limited to Dupont 1652-1 Surlyn. Exemplary of commercially available EAA resin for use in the present invention includes, but is not limited to Dupont 3990-L. Exemplary of commercially available mLLDPE resin for use in the present invention includes, but is not limited to Exxon Exact 3040 mLLDPE resin, which is supplied by Exxon. Exemplary of commercially available COC resin for use in the present invention includes, but is not limited to Topas 8007F-400, which is supplied by Topas Advanced Polymers.

Advantageously scoring e.g. mechanical or laser scoring of one or more layers, preferably the other abuse resistance layer and optionally a lidstock heat seal layer and/or one or more intermediate layers such as a barrier layer e.g. especially a metal such as aluminum foil layer, to create a tear directing line which facilitates opening is used. Many child resistant packages are difficult for the elderly and infirm adult to open. Some prior art packages must use scissors or a knife for opening. Beneficially, the present invention has very good tear properties, but require an initial child confounding step to gain access to the tab for tearing. An adult may easily access the tab which when used with a score line permits the blister package to be manually opened in a clean, fashion without use of scissors or other cutting implements. This easy to open feature of the present invention is coupled with child resistant packaging technology such as that described herein to provide a child resistant package which is simultaneously easy to open by an adult.

Reported properties are based on the following test methods or substantially similar test methods unless noted otherwise.

Oxygen Gas Transmission Rate ($O_2$GTR): ASTM D-3985-81
Water Vapor Transmission Rate (WVTR): ASTM F1249-90
Gauge: ASTM D-2103
Melt Index (M.I.): ASTM D-1238, Condition E (190° C.) (except for propene-based (>50% $C_3$ content) polymers tested at Condition TL (230° C.))
Melting point: ASTM D-3418, DSC with 5° C./min heating rate
Glass transition temperature $T_g$ ASTM D3418
Gloss: ASTM D-2457, 45° angle Following are examples given to illustrate the invention, but these examples should not be taken as limiting the scope. All percentages are by weight unless indicated otherwise.

Films of 5, 6, 7, 8, 9 or more layers are contemplated for the lidstock. Films of 1, 2, 3, 4, 5, 6, or more layers are contemplated for the forming (blister) film. The inventive package may use multilayer films that may include additional layers or polymers to add or modify various properties of the desired film such as heat sealability, interlayer adhesion, wrinkle resistance, puncture resistance, printability, toughness, gas and/or water barrier properties, abrasion resistance, printability, and optical properties such as gloss, haze, freedom from lines, streaks or gels. These layers may be formed by any suitable method including coextrusion, extrusion coating and lamination.

Unless otherwise noted, the thermoplastic resins utilized in the present invention are generally commercially available in pellet form and, as generally recognized in the art, may be melt blended or mechanically mixed by well-known methods using commercially available equipment including tumblers, mixers or blenders. Also, if desired, well known additives such as processing aids, slip agents, anti-blocking agents and pigments, and mixtures thereof may be incorporated into the film or applied to one or more surfaces thereof, e.g. by blending prior to extrusion, powdering, spraying, contact roller application, etc. Typically the resins and any desired additives are mixed and introduced to an extruder where the resins are melt plastified by heating and then transferred to an extrusion (or coextrusion) die. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other processing parameters chosen.

EXAMPLES 1-11

Example 1

According to the present invention, a package is made using a multilayer film with controlled release of a removable film section as a lidstock with a monolayer blister film. The lidstock of Example 1 is made by first providing an outer layer web comprising a biaxially oriented polyethylene terephthalate film (BOPET). Such films are commercially available as free-standing film sold as web rollstock e.g. one such film is available under the trademark FlexPET™ F-PAP from Flex America Inc., Elizabethtown, Ky., U.S.A. It has a reported thickness of 92 gauge (0.92 mil (23 micron)) and is corona treated on one side. This outer film web may be printed with indicia either on the inside or the outside of the web. A layer of release coating is applied in a pattern on a portion of the interior surface of the outer layer and over a portion of the indicia. For example, the web is coated by gravure or flexographic printing with a release coating on the corona treated interior surface of the web in a pattern defined by a section of the lidding film to be removed. The release coating may be silicone, release varnish, release lacquer or any other release agent. A primer may be applied between any layers as necessary to avoid adhesion failures for certain substrates, but a suitable ink for the indicia may serve the same function as a primer.

The web is first flood coated with a primer e.g. a water-based polyethylenimine primer on the same side as the pattern applied release coating. The primer side of the film is then extrusion coated with a coextrusion of low density polyethylene (LDPE) and ethylene acrylic acid (EAA) at a desired coat weight of 7.5 lbs./ream and with the LDPE in contact with the primer side of the OPET. The coextrusion contains a desired coat weight of LDPE of 6 lbs./ream and a desired coat weight of EAA of 1.5 lbs./ream. The LDPE resin is a blend of 87.5% LDPE and 12.5% white colorant. The LDPE is commercially available and sold under the trademark Petrothene® NA216000 by Equistar Chemicals, LP, Houston, Tex., U.S.A.; and the white colorant is commercially available and sold under the trade name Ampacet 111467 Color Concentrate by Ampacet Corporation, Tarrytown, N.Y., U.S.A. (Ampacet). The EAA is commercially available and sold under the trademark Nucrel® 3990L by E. I. du Pont de Nemours and Company, Wilmington, Del., U.S.A. (DuPont) and is a copolymer of ethylene and acrylic acid characterized by having a 9.5% weight content of acrylic acid comonomer.

The extrusion coated surface of the film is then laminated to the corona treated surface of a foil web. The foil web is a commercially available foil sold under the trade name 1235-O Foil by JW Aluminum Company, Mt. Holly, S.C., U.S.A. This foil is characterized as having a thickness of 35 gauge (0.35 mil (8.9μ)) and is corona treated. Typically corona treatment is used to control or enhance adhesion of inks, coatings or layers and it will be appreciated that non-corona treated films may be used wherever reference is made throughout this application to corona treated films, as desired to achieve the wanted properties.

Finally, the multilayer structure is extrusion coated on the foil side with a heat sealant layer. The heat sealant layer is a blend of 96 wt. % modified ethylene acrylate resin and 4 wt. % resin additive containing ethyl methyl acrylate and polyethylene glycerol (PEG) (1% PEG). The modified ethylene acrylate is commercially available and sold under the tradename Appeel® 20D828 by DuPont. The ethyl methyl acrylate and polyethylene glycerol additive is commercially available and sold under the tradename Ampacet 100578 by Ampacet.

The above multilayer film structure then has lines of weakness created by laser scoring in the outer layer and mechanically scoring the inner layer in shapes e.g. as shown in the drawings see e.g. FIGS. 2, and 5-9. Areas of weakness may also be made by continuous or intermittent abrasion, die cutting, laser scoring or mechanical scoring or perforating or other means known in the art to define peelable and rupturable sections of the package lidstock. For the outer layer, a score line loop is made through the outer BOPET layer circumscribing a blister compartment area and a portion of a tab area. For the opposing interior side of the lidstock, the lines of weakness is a straight mechanical score line through both the sealant and foil layers which crosses between the blister compartment area and tab area.

The scored lidding film is complete and may be stored as rollstock until required for a packaging operation. A package is then made by unwinding a portion lidstock which is brought into alignment with a separate blister film. This blister film is a multilayer film having inner and outer surface layers comprising a glycol modified PET with a core layer comprising HDPE with a hydrocarbon resin such as that sold by Nova Chemicals under the tradename Surpass HPS 167-AB. The blister film web in this example is a high barrier, PVC-free, forming web. The blister film is thermoformed into two blister compartments and product filled into the first blister compartment according to methods generally known in the art. Then the aligned lidstock and blister film are heat sealed together to form blister package in accordance with the present invention.

Although in this example 1 the blister film is formed by thermoforming, the blister web may be formed by either thermoforming or cold forming. Also, it may be a monolayer or multilayer film containing at least one polymer selected from the group comprising ethylene alpha olefin copolymers, polyvinyl chloride, polyvinyl dichloride, vinylidene chloride, polychlorotrifluoroethylene (Aclar®), copolymer of acrylonitrile and methyl acrylate (Barex®), ethylene vinyl alcohol copolymers, cycloolefin copolymers, aluminum foil, ionomer, nylon, polyester, polyolefins and blends and/or layer combinations thereof.

Example 2

Example 2 uses the same outer polyester web as for example 1 and is printed with ink and a release coating in the same manner as Example 1. The web is next passed into an adhesive laminator and flood coated with permanent adhesive. The adhesive is a two component solvent based polyester adhesive made by mixing 58.82% ADCOTE 536-A, 34.71% ethyl acetate (99.5%) and 6.47% ADCOTE™ 536-B. The ADCOTE™ 536-A is the isocyanate terminated polyester urethane component and ADCOTE™ B is the coreactant. Both are commercially available and sold under the trademark ADCOTE™ by Dow Chemical Company, Midland, Mich., U.S.A.

The polyurethane adhesive coated surface of the web is then laminated to a corona treated surface of an aluminum foil web. The foil web is the same as that of Example 1. The multilayer web is then extrusion coated on the foil side with the same heat sealant layer as in Example 1 and undergoes the same process for creating the lines of weakness as described in Example 1.

Example 3

Example 3 is the same as Example 2 except that the release coating is pattern printed on the foil before being contacted with the permanent adhesive and a pressure sensitive adhesive is extruded between the permanent adhesive and the outer polyester to create a removable section with peel and reseal properties thus creating a sticker for patient files, etc.

Example 4

Example 4 is the same as Example 2 except that the release coating is pattern printed on the foil and a pressure sensitive adhesive is substituted for the permanent adhesive to create a removable section with peel and reseal properties thus creating a sticker for patient files, etc.

Example 5

Example 5 is prepared in the same manner as Example 1 except that no release coating was applied and the coextruded LDPE/EAA layer is replaced with a layer that is designed to produce cohesive failure allowing separation of the removable section from the foil.

Example 6

Example 6 is prepared in the same manner as Example 2 except that no release coating was applied and the adhesive layer is a pressure sensitive adhesive designed to produce cohesive failure allowing separation of the removable section from the foil and to permit the removed section to be self-adhesively attached to a record keeping document which may be e.g. printed onto a sleeve or box designed to hold the blister package or on a related document which may be provided as an insert or supplement to the blister package.

Examples 7-11 are additional examples of the lidstock film according to the invention where the sealant layer is varied. In all of these examples, a multilayer lidstock film is provided having a base film and connected sealant film. The scoring of the outer layer may be varied but in all cases will define an open or closed loop shaped score line which either continuously or intermittently through the thickness of the outer layer to provide a peelably detachable portion of lidstock outer layer. The sealant film has a surface layer which is designed to contact the article to be packaged e.g. a drug in pill, caplet, capsule or other form, and this surface layer permits heat sealing of the multilayer film to form a container such as a pouch. The sealant layer is optionally either extrusion coated or adhesively laminated to a multilayer base film having the following structure: OPET/Primer/PE/EAA/Foil which may be either designed for cohesive failure or include a release coating as described above. Only the connected sealant film is varied.

Base Film

The base film is comprised of five layers having an ordered structure of: /Layer 1/Layer 2/Layer 3/Layer 4/Layer 5/corresponding to: /exterior layer 1/primer layer 2/bulk layer 3/adhesive layer 4/$O_2$ layer 5/; or more particularly, /OPET/PEULDPE/EVA/Al Foil/.

Layer 1 was a commercially available 0.92 mil, biaxially oriented polyethylene terephthalate (OPET) film corona treated on one side. The treated OPET film received a second corona treatment on the previously treated side prior to receiving an anchor coating of a water-based polyethyleneimine (PEI) primer (Layer 2) that was contact coated onto the corona treated side of the OPET film and dried just prior to lamination of the OPET film to 0.35 mil aluminum foil (Layer 5) using a coextrusion of LDPE (Layer 3) and EAA (Layer 4). Layers 3 and 4 were produced by the two-layer coextrusion of LDPE and EAA. The anchor coated side of the OPET film was laminated to 0.35 mil aluminum foil with a coextrusion of LDPE and EAA. The LDPE was a blend of 87.5 wt. % LDPE laminate resin and 12.5 wt. % of a white colorant in a carrier resin. The oxygen and moisture barrier was provided by a commercially available aluminum foil.

Example 7

In example 7, a sealant film of ionomer was extrusion coated onto a five layer base film made as described above. The aluminum foil surface of the multilayer base film having the structure OPET/primer/LDPE/EAA/foil was corona treated and then extrusion coated with ionomer. The ionomer used was a zinc salt of ethylene-methacrylate acid copolymer commercially available under the trademark Surlyn® 1652-1 and having a reported density of 0.940 g/cm$^3$ and melt index of 4.5 g/10 min.

The resultant six layer, multilayer film had the following structure: 0.92 mil OPET/primer/coex (0.42 mil LDPE/0.1 mil EAA)/0.35 mil foil/1.0 mil ionomer, and had a total nominal thickness of 2.8 mils (71 microns).

Example 8

The base film for example 8 was produced in the same manner as for example 7 except that the aluminum foil was not corona treated prior to the addition of the sealant film. In example 8, a three-layer coextrusion of: EAA; LDPE; and an 80:20 wt % blend of LDPE:mLLDPE was extrusion coated onto the aluminum foil surface of the multilayer base film with the EAA layer adhered to and in direct contact with the aluminum foil. The resultant multilayer film had the following structure 0.92 mil OPET/primer/(0.42 mil LDPE/0.1 mil EAA)/0.35 mil foil/0.17 mil EAA/0.65 mil LDPE/0.43 mil LDPE:mLLDPE and a total thickness of 3.04 mils (77.2 microns).

Example 9

The base film for example 9 was produced in the same manner as for example 8. In example 9, the sealant film was a commercially available, corona treated, cast APET film. The APET film received an additional corona treatment prior to adhesive lamination. The base and sealant films were laminated by coating the aluminum foil surface of the multilayer base film having the structure OPET/primer/LDPE/EAA/foil with a 2-part urethane adhesive using an analox roller followed by laminating contact to a corona retreated cast APET film. The resultant 7 layer film had the following structure: 0.92 mil OPET/primer/0.42 mil LDPE/ 0.1 mil EAA)/0.35 mil foil/0.08 mil adhesive/2 mil APET (inside) and a total thickness of 3.9 mils (99 microns).

Example 10

The base film for example 10 was produced in the same manner as for example 8 except that the LDPE/EAA coextrusion was applied slightly thicker. In example 10, the sealant film was a corona treated polyacrylonitrile film. The polyacrylonitrile film received an additional corona treatment just prior to lamination. The aluminum foil surface of the multilayer base film having the structure OPET/primer/LDPE/EAA/foil was then coated with a 2-part urethane adhesive using an analox roller and the structure was adhesively laminated to the corona retreated polyacrylonitrile film. The resultant multilayer film had the following structure (outside) 0.92 mil OPET/primer/0.56 mil LDPE/0.1 mil EAA)/0.35 mil foil/0.07 mil Adhesive/1.5 mil Barex (inside) and a total thickness of 3.5 mil.

Example 11

The base film for example 11 was produced in the same manner as for comparative example 8. In this example, the sealant film was a three-layer coextrusion of EAA, LDPE and Ethylene-norbornene copolymer (COO) which was extrusion coated onto the aluminum foil surface of the multilayer base film to produce an eight layer film having the structure: 0.92 mil OPET/primer/0.42 mil LDPE/0.1 mil EAA/0.35 mil foil/0.17 mil EAA/0.65 mil LDPE/0.43 mil COC and a total thickness of 3.0 mils (76 microns). This film is well suited to package physiologically active substances such as drugs and has advantageous moisture barrier, oxygen barrier, and low scalping properties.

Referring to the drawings, in all of the figures it will be appreciated that dimensions and relative sizes are not to scale but are chosen to illustrate the invention and its various aspects and features.

Figure 2:
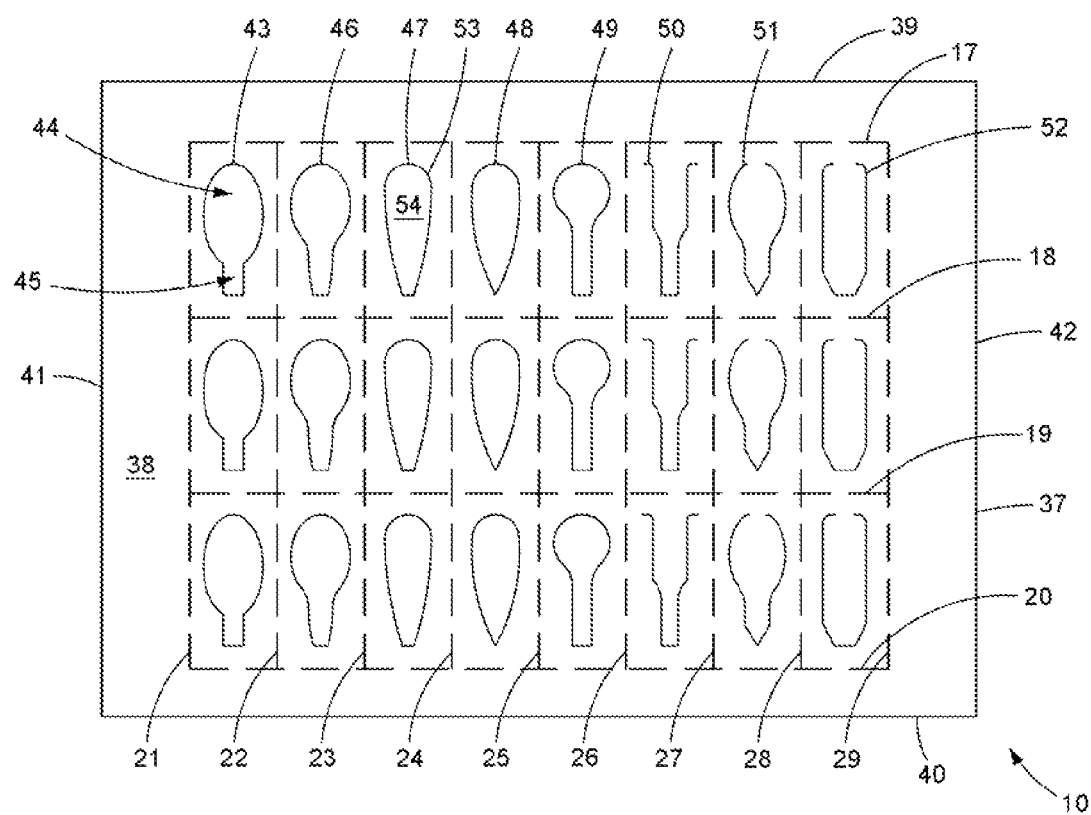
FIG. 2 is a top plan view illustrating a scored lidstock film in accordance with the present invention.

FIGS. 1 and 2 illustrate a blister package 10 in accordance with the present invention. FIG. 1 is a top plan view of a blister film 11 having an interior surface 12 with a perimeter formed by top edge 13, and opposing bottom edge 14, which are connected by first side edge 15, and opposing second side edge 16. Parallel spaced apart horizontal perforated lines 17, 18, 19, 20 define three rows in blister film 11. Parallel spaced apart vertical perforated lines 21, 22 23, 24, 25, 26, 27, 28, and 29 define eight columns in blister film 11. Together these horizontal and vertical lines define a plurality of units, doses, or portions of the package each of which is individually openable. Formed into each of these defined package portions are a plurality of blisters whose shape may vary in size may vary depending upon the product to be packaged. A first blister compartment 30 having a circular shape is depicted as the upper blister compartment in the three package units defined by the first column between perforated lines 21 and 22. The second column of three units defined by perforated lines 22 and 23 illustrate a first blister compartment of oval shape 31. In similar fashion, the three units in the third column defined by perforated lines 23 and 24 depict a first blister compartment of rectangular shape 32. The fourth column defined by perforated lines 24 and 25 illustrate that the first blister compartment may comprise a plurality of compartments such as the two circular compartments 33 depicted. The first blister compartment may also vary in size as illustrated by a large first blister compartment 34 shown in the three units depicted in the column defined by perforated lines 28 and 29. In FIG. 1, 24 individually openable portions are depicted containing three portions and each row containing eight portions. With the exception of the second column portions, each of the other 21 portions illustrate a second blister compartment 35 which is circular in shape. However the second compartment they also be made of a variety of shapes and sizes for example as shown in the three units illustrated in column 2 where a lower blister compartment 36 is formed into a square shape having rounded corners. Each of the first blister compartments is adapted for receiving a product such as a pill or caplet or capsule which may vary in size and shape which may or may not correspond to the shape of the first blister compartment but which in all cases will be appropriately sized to fit within the perimeter of a formed first blister compartment. As depicted in column four, a plurality of first blister compartments may be provided for multiple products to be opened in a single unit of the blister package 10.

Referring now to FIG. 2, the blister package 10 is equipped with a scored lidstock film 37 in accordance with the present invention. The lidstock 37 has an exterior surface 38 and whose perimeter boundary is defined by top edge 39 and opposing bottom edge 40 which ends are connected by a first side edge 41 and opposing second side edge 42. Lidstock film 37 is superimposed over blister film 11 with its heat sealable surface layer which is opposite the lidstock exterior layer 38 heat sealed to the blister film interior layer 12 with lidstock edges 39, 40, 41, and 42 correspondingly aligned with blister edges 13, 14, 15, and 16 to produce a hermetically sealed package containing a plurality of individually openable product units. As with the blister film 11 in FIG. 1, the lidstock 37 illustrates that the horizontal perforated lines 17, 18, 19, and 20, as well as the vertical perforated lines 21, 22, 23, 24, 25, 26, 27, 28, and 29 extend through both blister film 11 and lidstock film 37 to form three rows of eight units and eight columns of three units for a blister package 10 having 24 total units. It will be apparent that one or more of either or both of the horizontal and/or vertical perforated lines may optionally be extended to the perimeter edges of the package 10 to separate the blister package 10 into multiple unit strips or arrays. The package may be designed to be a single unit containing a single product or to have multiple units in a single blister pack. strips or arrays containing 2, 3, 4, 5, 6, 7, 8, 9, 10, 11, 12, 13, 14 or more units are contemplated as are units which contain a single product or two or more products such as two pills per unit (in this fashion smaller, easier to swallow pills may be provided as a single, two pill dose which is opened at one time from a single unit of blister package). The outermost layer of the lidstock 37 is made of a puncture resistant material to thwart opening by piercing through the outer layer of the lidstock. This outer layer is a line of weakness in the form of the loop which may be dosed or open, on one end. Preferably, this line of weakness will be a score line through the outermost layer of the lidstock to score line may be made in various shapes and sizes it is illustrated by score lines 43, 46, 47, 48, 49, 50, 51, and 52 three units depicted respective columns 1-8 as defined by respective pairs of vertical perforated lines: 21, 22; 22, 23; 23, 24; 24, 25; 25, 26; 26, 27; 27, 28; 28, 29. In each individual portion or unit, the loop is sized to substantially overlay and circumscribe the one or more first blister compartment(s) and to cross, preferably proximate a center portion of the second blister compartment (depicted in FIG. 1). By way of illustration, score line 43 is a closed loop having a first portion 44 which overlays and circumscribes a product contained in a first blister compartment 30. Score line 43 has a second portion 45 in a tab area of this unit of the lidstock where the score line 43 overlays and crosses over an area proximate the center point of the circular second blister compartment (depicted in FIG. 1). FIG. 2 illustrates a variety of shapes and sizes of score lines and loop shapes with score lines 43, 48, 47, 48, and 49 all depicting closed loops and score lines 50, 51, 52 each depicting an open loop which may also be termed a "bight shape". It will be appreciated that the score lines in the vicinity of the tab area portion may be designed to facilitate separation of the outer layer of the lidstock from itself on either side of the score line from the plane of the lidstock. It should be noted that score line 48 in column 4 overlays a perimeter enclosing the plurality of first blister compartments depicted in column 4 of FIG. 1 where each compartment may hold e.g. a pill. As will be further described below, removal of the portion of the outer layer of lidstock 37 which lies within the loop defined by a score line will expose an underlying lidstock layer. For example, the score line 47 in Column 3 defines a loop 53 having a peelable, separable outer layer portion 54. In the open loop or bighted loop embodiments, the open end provides an attachment point whereby the outer layer remains attached to the blister package to reduce the possibility of litter.

Referring now to FIG. 3, a plan view of a single portion (or single unit) container 55 of a double blister package in accordance with the present invention is shown. This single unit container 55 may be e.g. one of the units depicted in column 3 of FIGS. 1 and 2 where purpose of illustration may be thought of as having been detached from the multi-unit package. Unit container 55 has a top edge 56 and opposing bottom edge 57 connected by a first side edge 58 and opposing second side edge 59. The blister film 11 bounded by the perimeter of edges 56-59 is designated as blister film portion 60 and has an exterior surface 61. Located within the perimeter of the unit 55 are two blister compartments, a first blister compartment 32 which is formed e.g. by thermoforming and projects from the plane 62 of the blister film sheet as best seen in FIG. 4. The first blister compartment 32 has a perimeter edge 63 which in this embodiment is configured to exhibit a rectangular shape having rounded corners. Located within the first blister compartment is a product 64 such as a physiologically active substance e.g. a drug in caplet form. Spaced apart from the first blister compartment is a second blister compartment 35 which in this embodiment is circular in shape with a center point 65 and has a perimeter 66.

Referring now to FIG. 4, an end view of the container 55 of FIG. 3 is depicted and illustrates a multilayer construction of the blister package in general and unit 55 in particular. In FIG. 4, blister film portion 60 of blister film 11 is shown as a monolayer structure having exterior blister surface 61, first blister compartment 32 formed by a thinned out portion 67 of the blister film 11 and a second blister compartment 35 formed from a thinned out portion 68 of blister film 11. Although a monolayer blister film is depicted is will be appreciated that 2 or more layer structures may also be employed if desired. Attached to an interior surface 12 of blister film 11, e.g. by heat sealing, is a multilayer lidstock film 37 (also termed "lidstock"). This multilayer lidstock 37 is shown having five sequential layers viz, an inner layer 69, a first intermediate layer 70, a second intermediate layer 71, an optional third intermediate layer 72, and an outer layer 73 having an exterior surface 38. Outer layer 73 is a puncture resistant film which for child resistance will be bite resistant. Suitable outer layer materials include polyester and nylon films, especially oriented films and preferred are oriented nylon having a thickness of at least 0.5, and preferably at least 0.6, mil or oriented polyester having a thickness greater than 0.48 mil, suitably at least 0.75 mil and preferably at least 0.92 mil or more. This outer layer 73 may be printed on either side. Trap printing on the interior surface of the outer layer 73 will advantageously protect the print from abrasion and contact with external materials. The inner layer 69 is preferably polymeric, thermoplastic and heat sealable. Inner layer 69 has an interior surface 74 which is in contact with and heat sealed to the interior surface 12 of the blister film 11. Between inner layer 69 and outer layer 73 is a first intermediate layer 70 which is preferably a metal foil such as aluminum foil. Aluminum foil advantageously has both moisture barrier properties and oxygen barrier properties. Aluminum foil is also rupturable and may be selected to provide a barrier or cover for the first blister compartment through which a product may be reached by pushing the product through the foil wall as further described below with respect to FIGS. 9-12. Between the first intermediate layer 70 and the outer layer 73 is a second intermediate layer 71 which comprise an adhesive. Several types of adhesives may be employed. This layer may also be a blend of polymers and adhesives, and the adhesive layer may also comprise two or more adjacent adhesive layers to provide additional properties such as peel reseal characteristics. An optional third intermediate layer 72 is depicted and this layer may be a primer coating or a second adhesive or other coating. In one embodiment it is a primer coating which provides special adhesive properties especially when used in conjunction with a pattern applied release coating to facilitate removal of a portion of the outer layer to provide step-wise access to the contents of the first blister compartment as further elucidated below e.g. with respect to FIGS. 9-12. The optional third intermediate layer may be employed on either side of the second layer as may provide the desired utility.

Referring now to FIG. 5, a plan view is depicted of an opposite side of the container 55 of FIG. 3. Unit container 55 has a top edge 56 and opposing bottom edge 57 connected by a first side edge 58 and opposing second side edge 59. The lidstock film 37 bounded by the perimeter of edges 56-59 is designated as lidstock film portion 75 and has an exterior surface 38. Located within the perimeter of the unit 55 on the underside of the lidstock film 37 is the blister film (see FIG. 3) having two blister compartments shown in dashed line, a first blister compartment 32 having a perimeter edge 63 which in this embodiment is configured to exhibit a rectangular shape having rounded corners. Located within the first blister compartment is a product 64 (also shown in dashed line) such as a physiologically active substance e.g. a drug in caplet form. Spaced apart from the first blister compartment 32 is a second blister compartment 35 which in this embodiment is circular in shape with a center point 65 and has a perimeter 66.

A score line 47 forms a loop 53 which overlays and circumscribes the product 64 and the first blister compartment 32. It will be appreciated that with respect to the first compartment 32 is it only necessary that the score line loop 53 configuration be dimensioned of sufficient scope with respect to the product and first blister compartment to permit the separable portion 54 of the outer layer 73 of the lidstock 37 to be removed to permit push through access to the contents of the compartment. Of course the score line 47 may be continuous or intermittent as long as a peeling action will permit the outer layer to detach from at least the inner and first intermediate layers following the outer boundary set by the score line 47. Thus, the portion 54 within loop 53 may be peelably separated and removed, leaving attached the remainder of the outer layer 73 which is outside the loop 53. The score line loop may also be "open" at the end distal from the second blister compartment i.e. the loop may be bight shaped to permit access while retaining the partially peeled open outer layer so that it remains attached to the blister package to reduce the possibility of litter. The lidstock 37 may be divided into a blister compartment area 76 proximate to and adapted for overlaying the first blister compartment and a tab area 77 proximate to and overlaying the second blister compartment. The score line 47 has a tab portion 78 in a tab area 77 of the unit 55 with a tab portion end 79 which overlays and crosses the second blister compartment preferably proximate to center point 65. An optional weakened area 80, which is preferably a score line, extends through the inner layer and preferably substantially through (greater than 90% of the thickness) the first intermediate layer of foil. On one side of this weakened area lies the blister compartment area 76 and on the other side lies the tab area 77. This weakened area 80 acts as a tear propagation stop to prevent detachment of the inner layer 69 and/or first intermediate layer 70 in the blister compartment area 76 while permitting peelable removal of these same layers 69, 70 in the tab area 77 during a peeling operation of the tab.

Referring now to FIG. 6, a sectional view of the multilayer construction of the container 55 of FIG. 5 taken along lines 6-6 is shown. In FIG. 6, blister film portion 60 of blister film 11 is shown as a monolayer structure having exterior blister surface 61, a second blister compartment 35 formed from a thinned out portion 68 of blister film 11. Attached to an interior surface 12 of blister film 11, e.g. by heat sealing, is the interior surface 74 of the inner layer 69 of a multilayer lidstock film 37. This multilayer lidstock 37 is shown having five sequential layers, viz, an inner layer 69, a first intermediate layer 70, a second intermediate layer 71, an optional third intermediate layer 72, and an outer layer 73 having an exterior surface 38. The second blister compartment 35 has a perimeter 66 and is typically empty providing a thinned out blister film portion 68 which is spaced apart from the inner layer 66 of the lidstock 37. Outer layer 73 has a score line 47 loop. In FIG. 6, the tab portion of the lidstock 37 is shown having tab portion end 79. The interior surface of the outer layer 73 within the perimeter of the loop defined by the score line 47 is coated with release coating 81 to facilitate manual peelable removal of the outer layer 73 within the area inside the loop from the intermediate layers of the lidstock.

Figure 7:
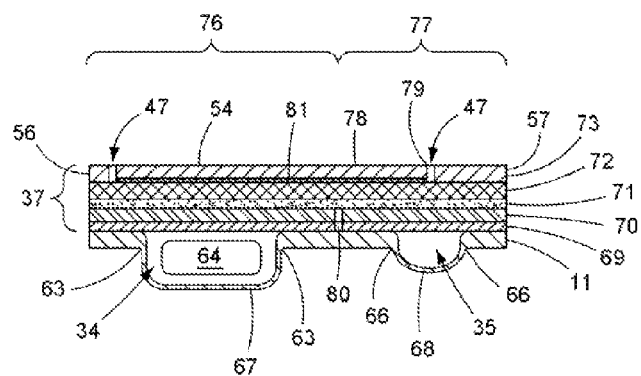
FIG. 7 is a sectional view of the multilayer construction of the container of FIG. 5 taken along lines 7-7.

Referring now to FIG. 7, a sectional view of the multilayer construction of the container 55 of FIG. 5 taken along lines 7-7 is shown extending from top edge 56 to bottom edge 57. The blister film 11 is shown with a first blister compartment 34 formed by thinned out portion 67 of blister film 11 and containing a product 64 within its perimeter 63. This compartment is located within the blister compartment area 76. Blister film 11 also has a second blister compartment 35 formed by thinned out portion 68 of blister film 11 and being empty i.e. containing no product within its perimeter 66. Attached to the blister film 11 and hermetically sealing blister compartments 34 and 35 is a multilayer lidstock 37 having, sequentially, an inner heat seal layer 69, a first intermediate layer which is a rupturable layer, preferably of aluminum foil, a second intermediate adhesive layer 71, an optional third intermediate layer of primer coating 72, and an outer puncture resistant layer 73. The inner layer 69 is preferably a heat seal layer having an area of weakness such as a score line 80 extending therethrough. Advantageously, this score line 80 may also extend substantially and preferably completely through the first intermediate layer 70 of e.g. aluminum foil as shown in FIG. 7. On one side of this score line is the blister compartment area 76 and the opposite side is the tab area 77. These areas 76 and 77 exist regardless of the presence or absence of these optional areas of weakness depicted as score line 80. Outer layer 73 is scored in a loop shape by score 47 and within the perimeter of this loop 53 on the interior surface of the outer layer is a release coating layer 81. This release coating facilitates removal of portion 54 of the outer layer from the remaining layers of the lidstock 37 by peeling from the tab area 77 across through the blister compartment area 76 as further described below. It will be appreciated that the release layer 81 may be pattern applied e.g. by printing to the outer layer 73 and that its exact coverage area may vary as long as it is capable of achieving its purpose to facilitate separation of the outer layer portion 54 from the first intermediate layer 70. Ideally, coverage will be coextensive with the portion 54 of the outer layer within the perimeter of the scored loop 53, but to facilitate manufacturing tolerances, may suitably extend past this perimeter as long as the integrity of the package and other desired functionalities are not impacted, e.g. child opening resistance, unit integrity, delamination resistance, print and package appearance, etc.

Figure 8:
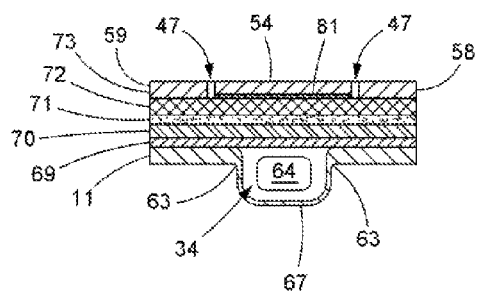
FIG. 8 a sectional view of the multilayer construction of the container of FIG. 5 taken along lines 8-8.
Figure 13:
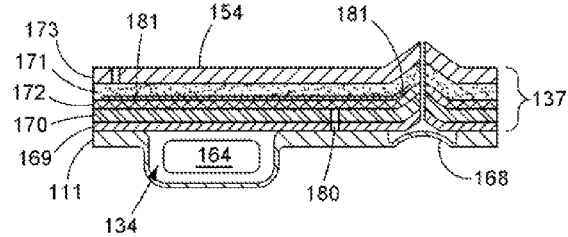
FIG. 13 is a sectional view of an alternative multilayer PSA sticker embodiment of a child-resistant package in accordance with the present invention illustrating an initial first opening step.
Figure 14:
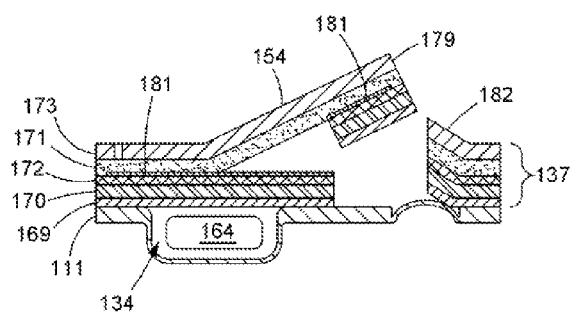
FIG. 14 is a sectional view of an alternative multilayer PSA sticker embodiment of a child-resistant package in accordance with the present invention illustrating a second opening step.
Figure 15:
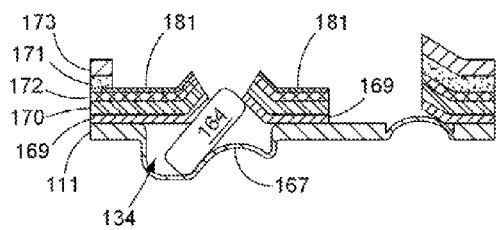
FIG. 15 is a sectional view of an alternative PSA sticker multilayer embodiment of a child-resistant package in accordance with the present invention illustrating a third opening step which releases the product from the package.

Referring now to FIG. 8, a sectional view of the multilayer construction of the container 55 of FIG. 5 taken along lines 8-8 is shown extending from first side edge 58 to second side edge 59. The layers and features are numbered as for FIGS. 3-7 above.

Referring now to FIGS. 9-12, a series of sequential sectional views of a multilayer embodiment of a child-resistant package in accordance with the present invention are depicted illustrating the manner of opening of the blister package unit 55 beginning with an initial first opening step shown in FIG. 9. The features and numbering is as for FIGS. 1-8 above. The present invention provides a blister package which is resistant to opening by young children, in part, by provision of a sequential multi-step process to gain access to the product 64 contained within the first blister compartment 34. At the same time the sequential steps for opening are easily comprehended by an adult and the sequential steps to open the package may be easily manipulated by elderly or infirm adults.

Referring to FIG. 9, the initial step involves using a thumb or finger to depress the thinned out portion 68 which covers the second blister compartment 35 thereby applying a force and pressure to rupture through the lidstock 37 in the tab area 77 at the score line 47. The manually applied force stresses the tab portion end 79 applying stretching forces to the lidstock layers 69-73 at the area which is weakened by the score line 47 in the outer layer 73 to the extent that a tear 82 propagates through the thickness of the lidstock causing tab portion end 79 to separate from tab anchor 83. It will be appreciated that there is no need to rupture through the second blister compartment 35. Also, the provision of the second blister acts to obscure the initial opening step from a young child who cannot yet read a printed instruction such as "press here", or a sequential indicator such as "1", "2", "3," or "A", "B", "C", which will easily guide an adult to follow the appropriate opening steps. The second blister compartment 35 overlays and is spaced apart from the heat seal layer 69 opposite a score line 47 in outer layer 73 in the tab area portion 77. Thus, the second blister compartment 35 is adapted for manual inward deformation which activates separation of the lidstock 37 from itself along the tear line 82 from the score line 47 adjacent to the tab edge 79. Once the tab end 79 is freed from the tab anchor end 83, the tab end 79 may be grasped and peeled toward the blister compartment area 76 as the second opening step as best seen in FIG. 10.

Referring now to FIG. 10, a sectional view of a multilayer embodiment of a child-resistant package in accordance with the present invention illustrating a second opening step. In this step end 79 is grasped manually and pulled toward top edge 56. As the end 79 is forced toward the edge 56, the lidstock 37 is pulled away from the blister film 11. The illustration depicts a clean break between the blister film 11 and the inner layer 69, however the break may not be clean between these two layers and may occur anywhere between the blister film layer 11 and the lidstock outer layer 73; it may even migrate from one side of a layer to the other side or migrate across or back and forth crossing several layers or split in between the thickness of a layer or layers. What is important functionally is that the peelable, separable outer portion 54 of outer layer 73 is peeled away from the blister film 11 in a manner that the first blister compartment remains covered by the heat seal inner layer 69 and the first intermediate layer (which is preferably aluminum foil) 70. In the illustrated embodiment a release coating 81 has been pattern applied to the interior surface of the outer layer 73 to facilitate separation in the plane of the release coating 81; the separation may occur on either side of this coating or through it or migrate back and forth in all events the separation occurs easily in a directed fashion which achieves the goal of removing the tough puncture resistant outer layer from more easily ruptured layers, especially the inner layer 69 and first intermediate layer 70. It is noted that the thicknesses of the individual layers are relatively thin, but are shown as being relatively thick for purpose of illustration of these layers and to accommodate the written description, drawing layer numbering and for explanatory purposes. While a secondary tear line 84 may naturally propagate upward toward the outer layer 73 as the tab end 79 is lifted away from the blister film 11, score line 80 may be provided in layers 69 and/or 70 to stop or prevent accidental removal of these layers 69, 70 from their coverage of the first blister compartment 34 and its contained product 64. This score line 80 may also act to direct the tear upward toward the outer layer 73. Outer layer 73 is made of a tear resistant material such as polyester or oriented nylon to prevent its unwanted breakage and it will maintain its integrity and facilitated by the release coating will separate from the remaining intermediate layers e.g. second intermediate adhesive layer 71, first intermediate layer 70 and/or primer layer 73 and follow the loop perimeter to separate and the outer portion 54 therefrom. Peeling of the outer portion 54 may continue until it is entirely removed as shown in FIG. 11, or a bight shaped loop may be employed to permit a continued attachment proximate the top edge 56.

Referring now to FIG. 11, a sectional view of a multilayer embodiment of a child-resistant package in accordance with the present invention illustrates the product containing package following removal of a portion 54 of the lidstock 37. In FIG. 11, lidstock portion 54 (See FIGS. 9-10) has been removed and the first blister compartment 34 of blister film 11 containing the product 64 is now covered only by easy to rupture layers 69-72. Generally, layers 69, and 71 and 72 will be very thin and layer 70 is preferably an easy to rupture aluminum foil which will control the rupture properties and facilitate rupture or breakthrough of the layers covering the first blister compartment 34.

Referring now to FIG. 12, a sectional view of a multilayer embodiment of a child-resistant package in accordance with the present invention illustrates a third opening step which releases the product 64 from the package. After the first two steps of pushing the first blister to cause a tab area end to protrude and detach from the tab anchor end followed by a second step of peeling off the tough outer layer, a third step remains. The third sequential step is to push against the thin film portion 67 of the first blister film compartment 34 which in the drawing is shown as a force applied at point "F" which causes the product 64 which is sufficiently rigid to transfer the force to the remaining covering lidstock layers 69-72 thereby breaking through or rupturing through to provide access to the product 64. Thus, child resistance to opening is provided by provision of three sequential steps to gain access to a product 64. These same three steps may be easily comprehended and manipulated by an adult to provide easy adult access while denying access to young children. In addition the outer layer material will be puncture resistant to prevent opening by biting through its material as will also be the blister film 11.

Referring now to FIGS. 13-16, an alternative embodiment is presented which depicts a lidstock outer layer that is removable with an attached pressure sensitive adhesive that permits it to be adhered to a record sheet to facilitate recordation of use of the enclosed product. This compliance record-keeping may be usefully employed with parts tracking or with drug administration either in a hospital or nursing home setting or for home use where record keeping is desirable. The numbers employed in this embodiment mirror the features disclosed above with respect to FIGS. 9-12 with the addition of a leading "1" to denote a different embodiment.

Figure 16:
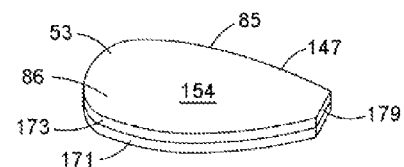
FIG. 16 is a schematic view of a PSA sticker outer layer in accordance with the present invention.

Referring now to FIG. 16, a schematic view is presented of a sticker 85 having a printed indicia surface 86 on outer portion 154 which may contain any desired information including e.g. dosage, day, "Take with food", "Take with water" reminders or other instructions, warnings, or branding. Sticker 85 has an outer layer 173 with a loop 53 formed by a score line 147 which enabled the sticker to be peeled away from the lidstock substrate. A release coating was employed beneath pressure sensitive adhesive layer 171 so that adhesive layer 171 remained with and attached to outer layer 173 to permit the sticker to be re-attached adhesively to another surface e.g. of a record-keeping document paper. The tab end 179 of the sticker may be used to both easily peel the sticker away from the lidstock substrate and to hold and apply the sticker to a document or other surface since the tab end 179 may be designed to retain a portion of the lidstock substrate to cover the adhesive and thereby avoid adhesive contact with a person's fingers (see e.g. FIG. 14).

It will also be appreciated that once the sticker 85 is removed it may reveal a lidstock intermediate layer such as layer 170 (which may be uncoated or have a transparent coating thereon) and that such layer e.g. of an aluminum foil may be printed with indicia to provide any desired information including e.g. reminders, instructions, warnings, or branding, etc.

Embodiments of the Invention

1. A blister package comprising:
  (a) a product;
  (b) a multilayer lidstock having:
    i) an inner thermoplastic heat sealable layer having a thickness of from 0.10 to 1.0 mil;
    ii) a first intermediate layer having a WVTR of less than 0.03 g/100 in$^2$/24 hours at 1 atmosphere and 23° C. and having a thickness of from 0.25 to 2 mil;
    iii) a second intermediate adhesive layer;

What is claimed is:

1. A buster package comprising:
   (a) a product;
   (b) a multilayer lidstock having:
      i) an inner thermoplastic heat sealable layer having a thickness of from 0.10 to 1.0 mil;
      ii) a first intermediate layer having a WVTR of less than 0.03 g/100 in$^2$/24 hours at 1 atmosphere and 23° C. and having a thickness of from 0.25 to 2 mil;
      iii) a second intermediate adhesive layer;
      iv) an outer bite resistant layer comprising at least one of (i) a polyester layer having a thickness of at least 0.75 mil and (ii) an oriented nylon layer having a thickness of at least 0.50 mil, and said outer layer having a loop shaped score line therethrough, wherein said adhesive layer is disposed between said first intermediate layer and said outer layer; and
      (v) a release coating disposed at least within said loop shape and between said first intermediate layer and said outer layer for manual peelable detachment of said outer layer from said first intermediate layer; and
   (c) a formed blister film having at least two compartments: (i) a first blister compartment adapted for receiving said product; and (ii) a second blister compartment having a blister compartment film overlaying and spaced apart from a portion of said lidstock heat seal layer opposite a tab area portion of said score line in said polyester layer; and wherein said second blister compartment is adapted for manual inward deformation activation of separation of said lidstock from itself along said score line tab area portion;
   wherein said product (a) is hermetically sealed between (b) and (c) within said first blister compartment.

2. A blister package, as defined in claim 1, wherein in said lidstock, said heat seal layer and said intermediate fail layer each has at least one area of weakness wherein said area is weakened by one or more scores, perforations, nicks, scratches, cuts, or foramina therethrough adapted for breaking propagation of a tear line thereacross; and said outer layer score line area extends transversely across said area of weakness of said heat sealable layer.

2. A blister package, as defined in claim 1-17, wherein in said lidstock, said heat seal layer and said intermediate foil layer each has at least one area of weakness wherein said area is weakened by one or more scores, perforations, nicks, scratches, cuts, or foramina therethrough adapted for breaking propagation of a tear line thereacross; and said outer layer score line area extends transversely across said area of weakness of said heat sealable layer.

3. A blister package, as defined in claim 1-17, wherein said release coating is disposed between said adhesive layer and said outer layer of said lidstock by pattern applying on an interior surface of said outer layer.

4. A blister package, as defined in claim 1-17, wherein said release coating is disposed between said adhesive layer and said first intermediate layer of said lidstock by pattern applying on an interior surface of said lidstock first intermediate layer distal from said inner heat sealable layer of said lidstock.

5. A blister package, as defined in claim 1-17, wherein said heat seal lidstock layer comprises:
   a drug contact layer having at least 90 wt. % of an ethylene norbornene copolymer or derivative thereof having a glass transition temperature of from 65 to 110° C.

6. A blister package, as defined in claim 1-17, wherein said lidstock and said blister film each has a WVTR of less than 0.03 g/100 in$^2$/24 hours at 1 atmosphere and 23° C.

7. A blister package, as defined in claim 1-17, wherein at least one of said lidstock and said blister film has a WVTR of less than 0.01 g/100 inches$^2$ per 24 hours at Room Temperature (RT) (23° C.) and 1 atmosphere.

8. A blister package, as defined in claim 1-17, wherein: at least one of said heat seal layer of said lidstock and said blister film comprises at least 90 wt. % ethylene norbornene copolymer or derivative thereof.

9. A blister package, as defined in claim 1-17, wherein: both of said heat seal layer of said lidstrock and said blister film each comprises at least 90 wt. % ethylene norbornene copolymer or a derivative thereof.

10. A blister package, as defined in claim 1-17, wherein said lidstock heat sealable layer has a thickness of from 0.10 to 0.50 mil.

11. A blister package, as defined in claim 1-17, wherein said product comprises at least one physiologically active substance or medical device.

12. A blister package, as defined in claim 1-17, wherein said lidstock outer layer comprises oriented polyester.

13. A blister package, as defined in claim 1-17, wherein said lidstock outer layer comprises oriented nylon.

14. A blister package, as defined in claim 1-17, wherein said lidstock comprises a removable outer layer and pressure sensitive adhesive adapted for forming a sticker for manual adhesive application to a recordkeeping document.

15. A blister package, as defined in claim 1-17, wherein said first intermediate layer comprises aluminum foil.

16. A blister package, as defined in claim 1-17, wherein at least one of said lidstock and said blister film has an O$_2$TR value of less than or equal to 10 cm$^3$/100 in$^2$/24 hours at 1 atmosphere and 23° C.

17. A blister package, as defined in claim 1-17, wherein both of said lidstock and said blister film have O$_2$TR values of less than or equal to 10 cm$^3$/100 in$^2$/24 hours at 1 atmosphere and 23° C.

Various embodiments have been described above. Although the invention has been described with reference to these specific embodiments, the descriptions are intended to be illustrative and are not intended to be limiting. Various modifications and applications may occur to those skilled in the art without departing from the true spirit and scope of the invention as defined in the appended claims.

3. A blister package, as defined in claim 1, wherein said release coating is disposed between said adhesive layer and said outer layer of said lidstock by pattern applying on an interior surface of said outer layer.

4. A blister package, as defined in claim 1, wherein said release coating is disposed between said adhesive layer and said first intermediate layer of said lidstock by pattern applying on an interior surface of said lidstock first intermediate layer distal from said inner heat sealable layer of said lidstock.

5. A blister package, as defined in claim 1, wherein said heat seal lidstock layer comprises:
 a drug contact layer having at least 90 wt. % of an ethylene norbornene copolymer or derivative thereof having a glass transition temperature of from 65 to 110° C.

6. A blister package, as defined in claim 1, wherein said lidstock and said blister film each has a WVTR of less than 0.03 g/100 in2/24 hours at 1 atmosphere and 23° C.

7. A blister package, as defined in claim 1, wherein at least one of said lidstock and said blister film has a WVTR of less than 0.01 gi 100 inches2 per 24 hours at Room Temperature (RT) (23° C.) and 1 atmosphere.

8. A blister package, as defined in claim 1, wherein: at least one of said heat seal layer of said lidstock and said blister film comprises at least 90 wt. % ethylene norbornene copolymer or derivative thereof.

9. A blister package, as defined in claim 1, wherein: both of said heat seal layer of said lidstrock and said blister film each comprises at least 90 wt. % ethylene norbornene copolymer or a derivative thereof.

10. A blister package, as defined in claim 1, wherein said product comp at least one physiologically active substance or medical device.

11. A blister package, as defined in claim wherein said lidstock outer layer comprises oriented polyester.

12. A blister package, as defined in claim 1, wherein said lidstock outer layer comprises oriented nylon.

13. A blister package, as defined in claim 1, wherein said lidstock comprises a removable outer layer and pressure sensitive adhesive adapted for forming a sticker for manual adhesive application to a recordkeeping document.

14. A blister package, as defined in claim 1, wherein said first intermediate layer comprises aluminum foil.

15. A blister package, as defined in claim 1, wherein at least one of said lidstock and said blister film has an O2TR value of less than or equal to 10 cm3/100 in2/24 hours at 1 atmosphere and 23° C.

16. A blister package, as defined in claim 1, wherein both of said lidstock and said blister film have 02TR values of less than or equal to 10 cm3/100 in2/24 hours at 1 atmosphere and 23° C.

17. A blister package, as defined in claim 1, wherein the release coating is substantially coextensive with a portion of the outer bite resistant layer disposed within said loop shape.

* * * * *